US007952770B2

(12) United States Patent
Ikeno et al.

(10) Patent No.: US 7,952,770 B2

(45) Date of Patent: May 31, 2011

(54) IMAGE READING APPARATUS

(75) Inventors: Takahiro Ikeno, Owariasahi (JP); Yoshinori Osakabe, Seto (JP); Tetsuya Kato, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1150 days.

(21) Appl. No.: 11/380,722

(22) Filed: Apr. 28, 2006

(65) Prior Publication Data

US 2006/0245013 A1 Nov. 2, 2006

(30) Foreign Application Priority Data

Apr. 28, 2005 (JP) ................................ 2005-131454

(51) Int. Cl.
*H04N 1/40* (2006.01)

(52) U.S. Cl. ......................... 358/461; 358/474; 358/497

(58) Field of Classification Search ........................ None
See application file for complete search history.

(56) References Cited

U.S. PATENT DOCUMENTS

| | | | | |
|---|---|---|---|---|
| 5,682,252 | A * | 10/1997 | Ando | 358/461 |
| 5,892,590 | A * | 4/1999 | Ida et al. | 358/406 |
| 6,323,933 | B1 * | 11/2001 | Anzai | 355/23 |
| 6,330,083 | B1 * | 12/2001 | Nabeshima et al. | 358/474 |
| 6,700,683 | B1 * | 3/2004 | Hashizume | 358/461 |
| 6,765,700 | B1 * | 7/2004 | Naito et al. | 358/486 |
| 6,892,945 | B2 * | 5/2005 | Shishido | 235/454 |
| 7,136,203 | B2 * | 11/2006 | Yokota et al. | 358/484 |
| 7,221,485 | B2 * | 5/2007 | Naito et al. | 358/474 |
| 7,289,249 | B2 * | 10/2007 | Sone | 358/461 |
| 7,359,090 | B2 * | 4/2008 | Cholewo et al. | 358/1.9 |

(Continued)

FOREIGN PATENT DOCUMENTS

JP S63-046867 A 2/1988

(Continued)

OTHER PUBLICATIONS

Japan Patent Office; Notification of Reason fpr Refusal in Japanese Patent Application No. 2005-131454 mailed Apr. 21, 2009.

(Continued)

*Primary Examiner* — King Y Poon
*Assistant Examiner* — Dung D Tran
(74) *Attorney, Agent, or Firm* — Baker Botts L.L.P.

(57) ABSTRACT

An image reading apparatus includes: a reading table having a transparent plate having an exposed area which constitutes a part of an outer surface of the table exposed to the exterior, and on which a document with an image thereon is placed; a document holding member movable relative to the table and between a closed and an open position, and thus holding the document and covering the plate; a scanning device disposed on a side of the plate opposite to the side on which the document is placed on the plate, the scanning device being reciprocated in a direction along the plate; an image reading device mounted in the scanning device and including a light source, the reading device emitting light from the light source toward the document on the plate, and receiving the reflected light from the document, to read the image thereby; a control unit controlling reading by the reading device, and a reciprocating movement of the scanning device; a reference member disposed within the exposed area, and used as a reference when an amount of the light emitted from the light source is adjusted; and an external-light detector determining whether external light is entering the table, based on at least one value obtained as a result of reading the reference member.

8 Claims, 15 Drawing Sheets

START
S21 MOVE CARRIAGE TO A POSITION CORRESPONDING TO WHITE LEFT AREA
S22 READ WHITE LEFT AREA WITH LIGHT SOURCE OFF
S23 MOVE CARRIAGE TO A POSITION CORRESPONDING TO BLACK MIDDLE AREA
S24 READ BLACK MIDDLE AREA WITH LIGHT SOURCE OFF
S25 CALCULATE DIFFERENCE BETWEEN OUTPUT VALUES RESPECTIVELY OBTAINED BY READING WHITE LEFT AREA AND BLACK MIDDLE AREA
S26 DIFFERENCE SMALLER THAN THRESHOLD ?
YES
NO
S27 EXTERNAL LIGHT NOT ENTERING
S28 EXTERNAL LIGHT ENTERING
END

U.S. PATENT DOCUMENTS

| | | | | |
|---|---|---|---|---|
| 7,453,055 | B2 * | 11/2008 | Susaki | 250/208.1 |
| 7,639,404 | B2 * | 12/2009 | Ikeno et al. | 358/461 |
| 2002/0110389 | A1 * | 8/2002 | Ozawa | 399/177 |
| 2003/0081275 | A1 * | 5/2003 | Shishido | 358/509 |
| 2004/0129784 | A1 * | 7/2004 | Iwaguchi et al. | 235/462.16 |
| 2004/0223194 | A1 * | 11/2004 | Naito et al. | 358/497 |
| 2005/0029352 | A1 * | 2/2005 | Spears | 235/454 |
| 2005/0094213 | A1 * | 5/2005 | Lee et al. | 358/3.26 |
| 2005/0134937 | A1 * | 6/2005 | Cholewo et al. | 358/461 |
| 2005/0206978 | A1 * | 9/2005 | Sone | 358/516 |
| 2006/0023267 | A1 * | 2/2006 | Ikeno et al. | 358/474 |
| 2006/0250661 | A1 * | 11/2006 | Susaki | 358/461 |
| 2007/0285739 | A1 * | 12/2007 | Nakano et al. | 358/474 |

FOREIGN PATENT DOCUMENTS

| | | | |
|---|---|---|---|
| JP | H10294870 | | 11/1998 |
| JP | H11168600 | | 6/1999 |
| JP | 2001-160890 | A | 6/2001 |
| JP | 2002-271589 | A | 9/2002 |
| JP | 200332490 | | 1/2003 |
| JP | 2003134307 | | 5/2003 |
| JP | 2004-331271 | A | 11/2004 |
| JP | 2002-271589 | A | 2/2009 |

OTHER PUBLICATIONS

European Patent Office, European Search Report for Related EP Application No. 06252248 dated Aug. 22, 2006.

European Patent Office; European Search Report in Application No. 06252248.7 mailed Oct. 30, 2009.

Japan Patent Office; Notification of Reason for Refusal in Japanese Patent Application No. 2009-134809 mailed Feb. 16, 2010.

* cited by examiner

CARRIAGE
41
FEEDER ROLLER
35
SEPARATING ROLLER
33
FEED-IN ROLLER
31
CARRIGE MOTOR
64
DOCUMENT FEEDER MOTOR
62
OPERATOR PANEL
7
SLOT PORTION
8
DRIVE CIRCUIT
65
DRIVE CIRCUIT
63
CIS
40
PANEL I/F
I/F
PARALLEL I/F
69
USB I/F
70
NCU
71
ASIC
61
MODEM
72
CPU
56
ROM
57
RAM
58
EEPROM
59
60
55
LEAD SENSOR
66
ROTARY ENCODER
67
LINEAR ENCODER
68

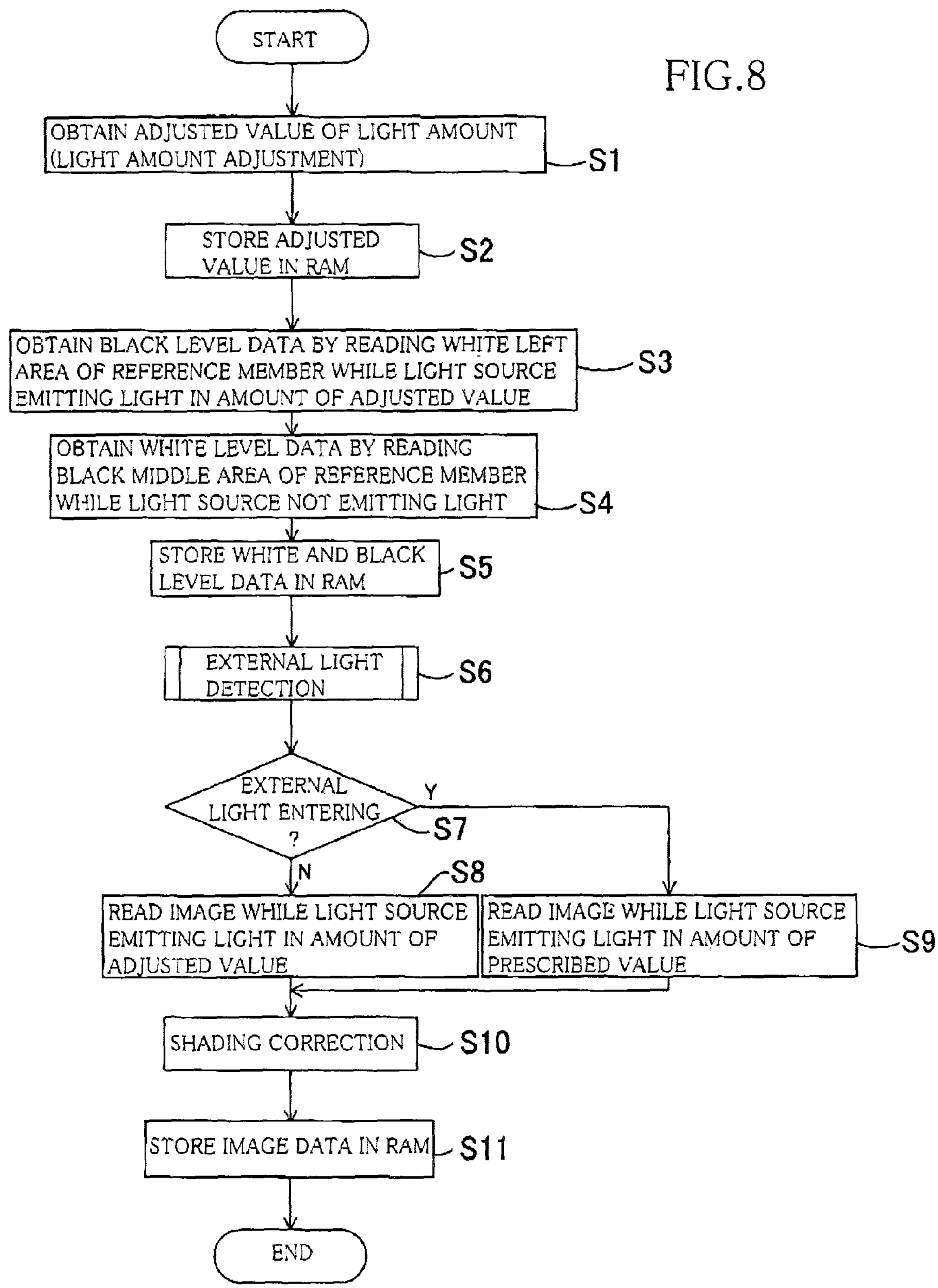
START
FIG.8
OBTAIN ADJUSTED VALUE OF LIGHT AMOUNT (LIGHT AMOUNT ADJUSTMENT)
S1
STORE ADJUSTED VALUE IN RAM
S2
OBTAIN BLACK LEVEL DATA BY READING WHITE LEFT AREA OF REFERENCE MEMBER WHILE LIGHT SOURCE EMITTING LIGHT IN AMOUNT OF ADJUSTED VALUE
S3
OBTAIN WHITE LEVEL DATA BY READING BLACK MIDDLE AREA OF REFERENCE MEMBER WHILE LIGHT SOURCE NOT EMITTING LIGHT
S4
STORE WHITE AND BLACK LEVEL DATA IN RAM
S5
EXTERNAL LIGHT DETECTION
S6
EXTERNAL LIGHT ENTERING ?
S7
Y
N
READ IMAGE WHILE LIGHT SOURCE EMITTING LIGHT IN AMOUNT OF ADJUSTED VALUE
S8
READ IMAGE WHILE LIGHT SOURCE EMITTING LIGHT IN AMOUNT OF PRESCRIBED VALUE
S9
SHADING CORRECTION
S10
STORE IMAGE DATA IN RAM
S11
END

IMAGE READING APPARATUS

INCORPORATION BY REFERENCE

The present application is based on Japanese Patent Application No. 2005-131454, filed on Apr. 28, 2005, the content of which is incorporated herein by reference.

BACKGROUND OF THE INVENTION

1. Field of the Invention

The invention relates to an image reading apparatus including a reading table having a transparent plate on which a document with an image thereon is placed, so that the document is irradiated with light transmitted through the transparent plate, to read the image thereby. The invention particularly relates to an image reading apparatus capable of detecting entrance of external light into a reading table.

2. Description of Related Art

As an image reading apparatus incorporated in a copy machine, a scanner, or a multifunctional apparatus having functions thereof, there are known a flatbed scanner, and an apparatus in which an image reading device, e.g., a CCD (Charge Coupled Device) or a CIS (Contact Image Sensor), is disposed at a predetermined relative position with respect to a mechanism called ADF (Auto Document Feeder) that operates to automatically feed document sheets, which is a document in the form of cut sheets, from a document supply tray to a catch tray along a feed path, in order to read an image on each document sheet while the document sheet is fed.

For instance, there is known an image reading apparatus that has a cover structure or a document holding member including an ADF, a reading table having at an upper surface thereof a platen glass, an image reading device disposed in the reading table, and a document supply tray on which document sheets each with an image thereon are stacked. On the platen glass, a fed-document reading area is defined, and the ADF feeds the document sheets one by one from the document supply tray to the fed-document reading area, so that the image reading device in the reading table operates to read the image on the document sheet as passing across the fed-document reading area on the platen glass. However, the image reading apparatus can also function as a flatbed scanner, that is, a stationary-document reading area is also defined on the platen glass, and the image reading apparatus can be used in such a manner that a document with an image thereon is placed on the platen glass and the document holding member is closed to hold down and fix in position the document, and then the image reading device is operated to read the image on the document.

The CCD or CIS used as an image reading device or image sensor has a light source and a light receiving element, and reads an image on a document as follows. The light source emits light toward the platen glass so that the emitted light is transmitted through the platen glass and reflected by a surface of the document. The reflected light is received by the light receiving element that converts the received light into electrical signals. Since undesirable variations occur with regard to operations of the light source and the light receiving element of such an image reading device, namely, an amount of light emitted from the light source and a spatial distribution of the light, and a photographic sensitivity of the light receiving element, a control operation called “shading correction” is implemented to correct image data obtained by reading the image on the document using the image reading device. More specifically, the shading correction is an operation such that the amount of the light as emitted from the light source is adjusted with respect to a white-colored reference member, and then the reference member is read to obtain white level data and black level data while the light source emits light of the amount adjusted as described above, so that the image data read thereafter is corrected based on the thus obtained white and black level data. For instance, the conventional image reading apparatus described above has the reference member on an under side of a partitioning member that is disposed to divide an upper surface of the platen glass into two areas, namely, the fed-document reading area and a stationary-document reading area, and the apparatus is set to adjust the amount of the light emitted from the light source with respect to the reference member, and obtain reference data, i.e., the white and black level data, prior to reading the image. It is noted that the amount of the light as emitted from the light source may be adjusted by adjusting an intensity of the light emitted therefrom.

Meanwhile, with improvement in the sensitivity of the image reading devices, it has recently become possible to use a light source of low illuminance. For instance, a CIS may employ as the light source a LED (Light Emitting Diode), or a LIDE (LED InDirect Exposure) using a LED and a linear light guide. Due to such lowering in the illuminance of the light sources, there arises a problem that reading of the reference member is significantly affected by external light. The term “external light” refers to indoor or outdoor light that enters the reading table of the image reading apparatus from the fed-document reading area or other places, when a document is placed within the stationary-document reading area on the platen glass and an image thereon is read by the image reading device while the document holding member being open.

Such external light does not enter the reading table while the document holding member is closed and covering an entire surface of the platen glass. However, in a case where an image of a document having a relatively large thickness such as book is placed on the platen glass to be read, the document holding member can not be completely closed, thereby allowing external light to enter the reading table. In another case where an image on a large-sized document is to be read, the document holding member may be purposely kept open during image reading so that an operator can see that a portion desired to be read in the document is properly positioned within the stationary-document reading area. In this case, too, external light may enter the reading table.

Where the illuminance of the light source is sufficiently high relative to external light, an amount of reflected light from the reference member is also sufficiently high, and addition of the external light to the reflected light does not lead to significant degradation in the quality of the read image. However, with decrease in the illuminance of the light source and accordingly the reflected light from the reference member, the ratio of the external light to the reflected light increases. Hence, when external light affects the adjustment of the amount of the light emitted from the light source (which may be referred to as “the light amount adjustment” hereinafter), namely, where the external light is entering the reading table during the light amount adjustment is performed, the illuminance of the light source of the image reading device, or the amount of the light emitted from the light source, is adjusted to a value that is smaller than when external light does not affect the light amount adjustment, by an amount corresponding to the external light. The amount of the light with which the document is irradiated to be read thereby accordingly decreases, making the read image blackish or darker than expected. In particular, in the case where the image reading device is moved to scan or read the document fixed in position on the stationary-document reading area, the influence of external light on the read image gradually reduces in a lateral direction from the side of the fed-document reading area to the opposite side, and thus the degradation in the quality of the read image is more significant in this case. JP-A-2003-134307 discloses a technique for resolving this problem, that is, shield plates are disposed on the laterally opposite sides of the image reading device to prevent incidence of external light on the light receiving element of the image reading device.

The shield plates can prevent incidence of external light on the image reading device in a direction from each of the lateral sides of the image reading device, but can not prevent entrance of external light into the reading table in a direction of a thickness of the platen glass. In particular, where a width of the partitioning member is made small for reducing the overall size of the image reading apparatus, or where the platen glass is constituted by a single glass plate, external light adversely affects the light amount adjustment, i.e., the adjustment of the light amount with respect to the reference member.

Hence, it is necessary to detect external light entering the reading table when the light amount adjustment for the image reading device is made and when an image is read. Although entrance of external light into the reading table is detectable by a sensor disposed for directly detecting the entering external light, or for detecting opening/closing of the document holding member, disposing such a sensor requires a space and goes against the existing demand to reduce the overall size of the image reading apparatus, as well as leads to increase in the number of components and assembly steps that in turn increases the cost of the apparatus.

SUMMARY OF THE INVENTION

This invention has been developed in view of the above-described situations, and it is an object of the invention to provide an image reading apparatus which includes a reading table and a light source in order to read an image on a document stationary on the reading table by emitting light from the light source toward the document, and which has an external-light detector that enables easily and economically detecting entrance of external light into the reading table.

To attain the above object, the invention provides an image reading apparatus including a reading table, a document holding member, a scanning device, an image reading device, a control unit, a reference member, and an external-light detector. The reading table has a transparent plate having an exposed area which constitutes a part of an outer surface of the reading table exposed to the exterior, and on which a document with an image thereon is placed. The document holding member is movable relative to the reading table and between a closed position and an open position, and thus holding the document and covering the transparent plate. The scanning device is disposed on a side of the transparent plate opposite to the side on which the document is placed on the transparent plate, and reciprocated in a predetermined direction along the transparent plate. The image reading device is mounted in the scanning device and includes a light source. The image reading device emits light from the light source toward the document placed on the transparent plate and receives the reflected light from the document, to read the image on the document thereby. The control unit controls reading by the image reading device, and a reciprocating movement of the scanning device. The reference member is disposed within the exposed area on the transparent plate, and used as a reference when an amount of the light emitted from the light source of the image reading device is adjusted. The external-light detector determines whether external light is entering the reading table, based on at least one value obtained as a result of reading the reference member by the image reading device.

In this apparatus, by closing the document holding member relative to the reading table, the document on the transparent plate is held down against the transparent plate, and the transparent plate is covered by the document holding member, thereby preventing external light from entering the reading table. The control unit makes the scanning device and the image reading device operate to read the image on the document. Prior to this image reading, the control unit makes the image reading device to have the light source emit light toward the reference member to read the reflected light therefrom, that is, receive the light as reflected by the reference member. The reading the reference member may be performed not only for the purpose of detecting external light entering the reading table, but also for the purpose of adjusting the amount of the light to be emitted from the light source during the subsequent image reading, and/or obtaining a luminosity reference. While the document holding member is open relative to the reading table, external light enters the reading table to affect the reading the reference member. A value obtained as a result of the image reading device reading the reference member while external light is entering the reading table differs from a value obtained as a result of reading the reference member while external light is not entering. Hence, the external-light detector can determine whether external light is entering the reading table based on the value the image reading device has obtained by reading the reference member.

According to this image reading apparatus, the image reading device reads the reference member, and the external-light detector detects whether external light is entering the reading table or not, based on the value obtained as a result of the reading the reference member. Thus, external light entering the reading table can be detected without using a sensor provided specially for detection of external light, thereby reducing the size and cost of the apparatus.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 8 is a flowchart illustrating an image reading operation routine according to which the control unit operates the scanner portion to read an image on a document sheet;

DETAILED DESCRIPTION OF PREFERRED EMBODIMENTS

Hereinafter, there will be described several embodiments of the invention, by referring to the accompanying drawings. It is to be understood that the following embodiments are described only by way of example, and the invention may be otherwise embodied with various modifications without departing from the scope and spirit of the invention.

First Embodiment

Figure 1:
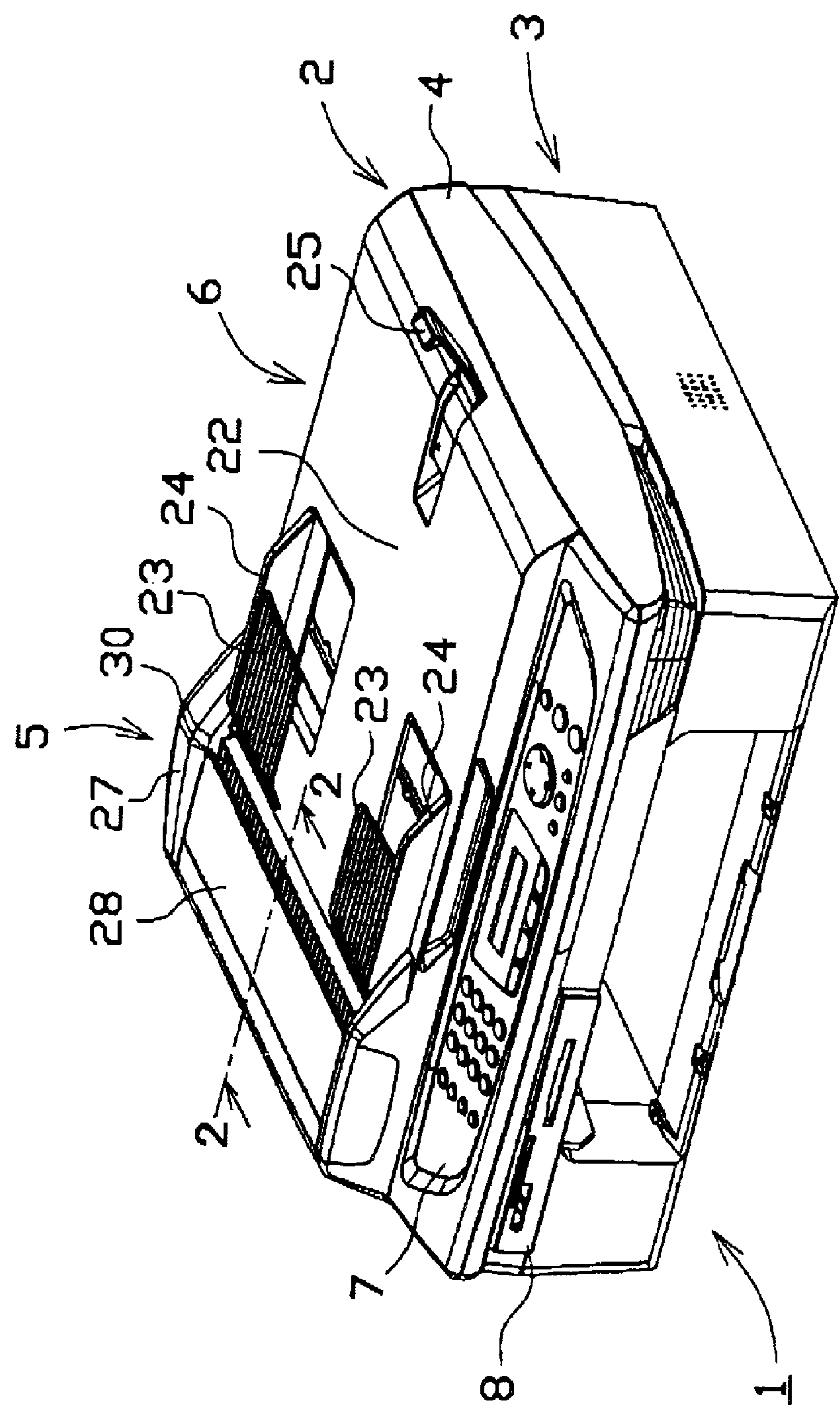
FIG. 1 is an external perspective view of a multifunctional apparatus including a scanner portion as an image reading apparatus according to a first embodiment of the invention.

FIG. 1 is an external view of a multifunctional apparatus according to a first embodiment of the invention. The multifunctional apparatus 1 is a MFD (Multi Function Device) integrally including a scanner function, a printer function, and a facsimile function. An upper portion of the multifunctional apparatus 1 constitutes a scanner portion 2 for reading an image of a document, and a lower portion of the multifunctional apparatus 1 constitutes a printer portion 3 for recording an image on a recording sheet. The scanner portion 2 of the multifunctional apparatus 1 is one example of an image reading apparatus according to the invention, and the other functions such as the printer function are optional. The image reading apparatus of the invention may take the form of a scanner having only a scanner function.

There will be described in detail a structure of the scanner portion 2, by referring also to FIG. 2 that is a schematic cross-sectional view, taken along line 2-2 in FIG. 1, of an ADF (Auto Document Feeder) included in the scanner portion 2.

Figure 2:
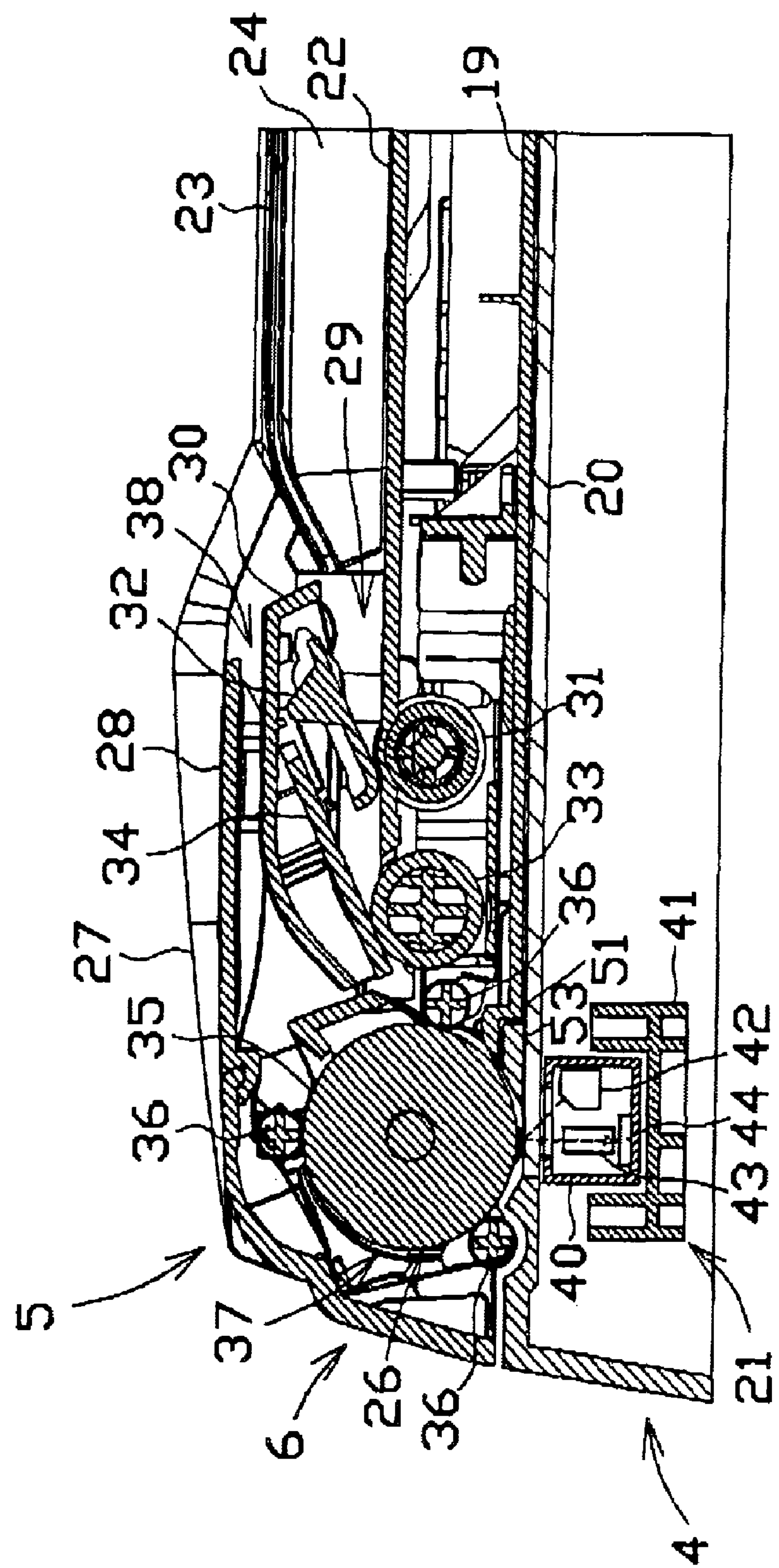
FIG. 2 is a schematic cross-sectional view along line 2-2 in FIG. 1, showing an ADF of the scanner portion.

As shown in FIGS. 1 and 2, the scanner portion 2 includes a cover structure functioning as a document holding member 6, and a reading table 4. The document holding member 6 includes an ADF 5, which is a mechanism for automatically feeding a document in the form of sheets one by one. The reading table 4 functions as a FBS (Flatbed Scanner). The document holding member 6 is attached at a rear side thereof to the reading table 4 by means of a hinge, such that the document holding member 6 is turn-openable/closable relative to the reading table 4. More specifically, the reading table 4 provides a main body of the multifunctional apparatus 1, and an upper surface of the reading table 4 is opposed to the document holding member 6. At the upper surface of the reading table 4, there is disposed a platen glass 20 as a transparent plate When the document holding member 6 is opened, the platen glass 20 constitutes a part of the upper surface of the reading table 4 that can be exposed to the exterior. Thus, a surface of the platen glass 20 includes an exposed area. When the document holding member 6 is closed, the upper surface of the reading table 4 including the platen glass 20 is entirely covered The reading table 4 incorporates a reading unit 21 disposed to be opposed to the platen glass 20.

The ADF 5 incorporated in the document holding member 6 operates to sequentially supplies document sheets stacked on a document supply tray 22 one by one into a feed pathway 26 and then feed each document sheet down to a catch tray 23 consisting of two segments. While each document sheet is fed by the ADF 5, the document sheet passes over the platen glass 20, so that the reading unit 21 under the platen glass 20 reads an image on the document sheet. The ADF 5 will be fully described later. On an under surface of the document holding member 6, there is disposed a holding member 19 formed of a sponge material or a white plate, in order to hold down the document on the platen glass 20, which document may be in the form of a sheet or a book, for instance.

On a front side of the reading table 4 is disposed an operator panel 7, in which various manual operation buttons and a liquid crystal display are arranged. The multifunctional apparatus 1 is operated in response to instructions input through the operator panel 7. However, where connected to a computer, the multifunctional apparatus 1 can be operated in response to instructions transmitted from the computer by way of a printer driver, a scanner driver, or others.

At an upper left portion in a front side of the multifunctional apparatus 1, there is disposed a slot portion 8 into which various kinds of recording media in the form of small memory cards can be inserted. When a small memory card containing image data representative of at least one image is inserted into the slot portion 8, the image data is read in and information related to the image data is displayed on the liquid crystal display, so that a user inputs some instructions through the operator panel 7 in order to have the printer portion 3 operate to record one or ones of the at least one image on a recording sheet or sheets, as desired.

As shown in FIGS. 1 and 2, the document holding member 6 includes the document supply tray 22 and the catch tray 23 that are arranged in vertical relation. The document supply tray 22 is formed integrally with an upper surface of the document holding member 6. When images on document sheets are to be read using the ADF 5, a stack of the document sheets is set on the document supply tray 22, with leading edges, in a direction of feeding, of the document sheets inserted in the ADF 5. The document supply tray 22 has a pair of document guides 24 that are spaced from each other in a front-rear direction of the multifunctional apparatus 1. The document guides 24 are slidable in the front-rear direction. The document guides 24 stand from the document supply tray 22, and guide two laterally opposite ends of the stack of document sheets on the document supply tray 22. Movements of the document guides are coupled with each other in a well-known manner, such that when one of the document guides is slid in a direction, the other document guide is slid in the opposite direction.

That is, when a width of the stacked document sheets is relatively small, a front-side one of the document guides is slid rearward, which slides a rear-side one of the document guides frontward. Thus, a distance between the document guides 24 corresponds to the width of the stack of the document sheets that are to be guided by the document guides 24, and the distance is decreased by the sliding movements of the respective document guides 24 which movements are asymmetrical with respect to a substantially center point in the front-rear direction. On the other hand, when the width of the stack of the document sheets is relatively large, the front-side document guide is slid frontward, and the rear-side document guide is slid rearward accordingly, so as to increase the distance between the document guides 24 in order to guide those relatively wide document sheets.

The catch tray 23 is integrally formed with the document guides 24, at a position over the document supply tray 22, with a space therebetween. Each document sheet is ejected from the ADF 5 to be received by the catch tray 23, namely, two widthwise opposite end portions of the document sheet are respectively received on the two segments of the catch tray 23. The document sheets ejected are separated from the stack of the document sheets on the document supply tray 22. A length of the catch tray 23 in the ejecting direction is smaller than that of each document sheet, and thus a leading portion, in the ejecting direction, of the ejected document sheet drops from the catch tray 23 to be received or supported on the document supply tray 22. Thus, the leading portion, in the ejecting direction, of the ejected document sheet overlaps a rear portion, in the feeding direction, of the stack of the document sheets on the document supply tray 22, but a rear portion of the ejected document sheet on the catch tray 23 and a leading portion of the document sheet on the document supply tray 22 are held separated from each other in the presence of the catch tray 23, thereby preventing mixing of the ejected document sheets with the stack of the document sheets yet to be fed. By making the length of the catch tray 23 relatively small, a required space over the document holding member 6 is made small, thereby reducing a thickness and an overall size of the multifunctional apparatus 1.

At a lateral end of the document supply tray 22 remote from the ADF 5, there is disposed a document stopper 25 that is operable between a standing position and a lying position. At the standing position, the document stopper 25 stands from a surface of the document supply tray 22. At the lying position, the document stopper 25 becomes flush with the surface of the document supply tray 22. For instance, when a document sheet having the substantially same size as the surface of the document supply tray 22 is ejected from the ADF 5 while the document stopper 25 is in the standing position as shown in FIG. 1, the document sheet is prevented from slipping down off the document supply tray 22 by being stopped by the document stopper 25. By disposing the document stopper 25 for thus receiving the document sheet as ejected, an area of the document supply tray 22 can be reduced, in turn enabling to reduce the size of the document holding member 6 integrally including the document supply tray 22. When not in use, the document stopper 25 is laid flat in order not to protrude from the document holding member 6. When shipped or stored, the multifunctional apparatus 1 is made compact in size by thus laying the document stopper 25 flat.

As shown in FIG. 2, inside the ADF 5 is formed the feed pathway 26 in a sideways U-like shape, that connects the document supply tray 22 to the catch tray 23. The feed pathway 26 is defined by an ADF mainbody 27 integral with the document holding member 6, and an ADF cover 28 turn-openable/closable relative to the ADF mainbody 27. As shown in FIG. 2, the ADF 5 includes a feed-in chute 29 formed as a passage having some width or vertical dimension by being defined between a horizontal surface that extends in the ADF mainbody 27 continuously from the document supply tray 22, and a partition plate 30 disposed inside the ADF cover 28. The feed pathway 26 is formed in a substantially sideways U-shape, namely, extends from the feed-in chute 29 to an ejecting chute 38 via a curved portion 37. The curved portion 37 and the ejecting chute 38 are also continuously formed as a passage having some width or vertical dimension by being defined by members such as the ADF mainbody 27, the ADF cover 28, and the partition plate 30.

In the feed pathway 26, means for feeding a document sheet is disposed. More specifically, as shown in FIG. 2, the feeding means is constituted by a combination of a feed-in roller 31 and a feed-in nip member 32 in pressing contact with the feed-in roller 31, a combination of a separating roller 33 and a separation nip member 34 in pressing contact with the separating roller 33, and a combination of a feeder roller 35 and a plurality of pinch rollers 36 each in pressing contact with the feeder roller 35. It is noted that the structure of the rollers and nip members is described by way of example only, and the feeding means may be replaced with any other known means. For instance, the number of the rollers and the positions thereof may be changed, and each nip member may be replaced by a pinch roller.

As shown in FIG. 2, the feed-in roller 31 is rotatably disposed substantially at a center of the feed-in chute 29, with a part of an outer circumferential surface of the feed-in roller 31 exposed from a horizontal upper surface of the ADF mainbody 27. The separating roller 33 is disposed in a similar manner as the feed-in roller 31, at a position spaced from the feed-in roller 31 in the feeding direction. That is, a part of an outer circumferential surface of the separating roller 33 is exposed from the horizontal upper surface of the ADF mainbody 27, such that the separating roller 33 is rotatable. A driving force of a document feeder motor 62 (shown in FIG. 7) is transmitted to the separating roller 33 and the feed-in roller 31 to rotate these rollers. The feed-in roller 31 and the separating roller 33 have a same diameter, and these rollers 31, 33 are rotated at a same speed. The driving force of the document feeder motor 62 is transmitted to the feed-in roller 31 via a single-cycle clutch interposed therebetween so that idle rotation of the feed-in roller 31 is allowed up to a single full turn.

The feed-in nip member 32 is disposed on the partition plate 30 and at a position opposed to the feed-in roller 31, such that the feed-in nip member 32 is displaceable toward and away from the feed-in roller 31. The feed-in nip member 32 is elastically biased downward by a spring member not shown, to be held in pressing contact with the outer circumferential surface of the feed-in roller 31 in a state where a document sheet is not nipped between the feed-in nip member 32 and the feed-in roller 31. Similarly, the separation nip member 34 is disposed on the partition plate 30 and at a position opposed to the separating roller 33, such that the separation nip member 34 is displaceable toward and away from the separating roller 33, and the separation nip member 34 is elastically biased downward by a spring member not shown, and held in pressing contact with an outer circumferential surface of the separating roller 33 in a state where a document sheet is not nipped between the separation nip member 34 and the separating roller 33. Each document sheet is pressed onto the feed-in and separating rollers 31, 33 by the feed-in and separation nip members 32, 34, and thereby nipped therebetween, so that the torque of the feed-in and separating rollers 31, 33 is transmitted to the document sheet.

The feeder roller 35 is disposed at the curved portion 37 of the substantially sideways U-shaped feed pathway 26. The feeder roller 35 has an outer circumferential surface that partially constitutes the curved portion 37, and thus has a diameter suitable for the curved portion 37. Like the feed-in roller 31 and separating roller 33, the feeder roller 35 receives the driving force of the document feeder motor 62, to be rotated thereby.

Around the feeder roller 53, there are disposed three pinch rollers 36 at respective positions. A shaft of each pinch roller 36 is elastically biased by a spring member and supported by the ADF mainbody 27 or the ADF cover 28 such that each pinch roller is rotatable and held in pressing contact with the outer circumferential surface of the feeder roller 35. Each pinch roller 36 rotates with the feeder roller 35. The document sheet is pressed onto the feeder roller 35 by the pinch rollers 36 so that the torque of the feeder roller 35 is transmitted to the document sheet.

On the downstream side of the feeder roller 35 with respect to the feeding direction, there is defined the ejection chute 38 between the ADF cover 28 and the partition plate 30. The ejection chute 38 is continuous from the curved portion 37 of the feed pathway 26 defined between an interior surface of the ADF cover 28 and the feeder roller 35. Hence, the document sheet supplied into the feed pathway 26 from the sheet feed tray 22 is sequentially fed through the feed-in chute 29, the curved portion 37, and the ejection chute 38, to be eventually ejected onto the catch tray 23.

The ADF cover 28 is pivotably supported at a position on a side of the feed-in roller 31 near the sheet feed tray 22, so that the ADF cover 28 can be opened by being turned upward. When the ADF cover 28 is opened, the feed-in chute 29 and the curved portion 37 are exposed to the exterior, and the feed-in roller 31 and the separating roller 33 are respectively separated from the feed-in nip member 32 and separation nip member 34. The ADF cover 28 is opened, when a paper jam occurs in the feed pathway 26 and the caught paper is to be eliminated, or when a maintenance work for members inside the ADF 5 is to be implemented.

Figure 3:
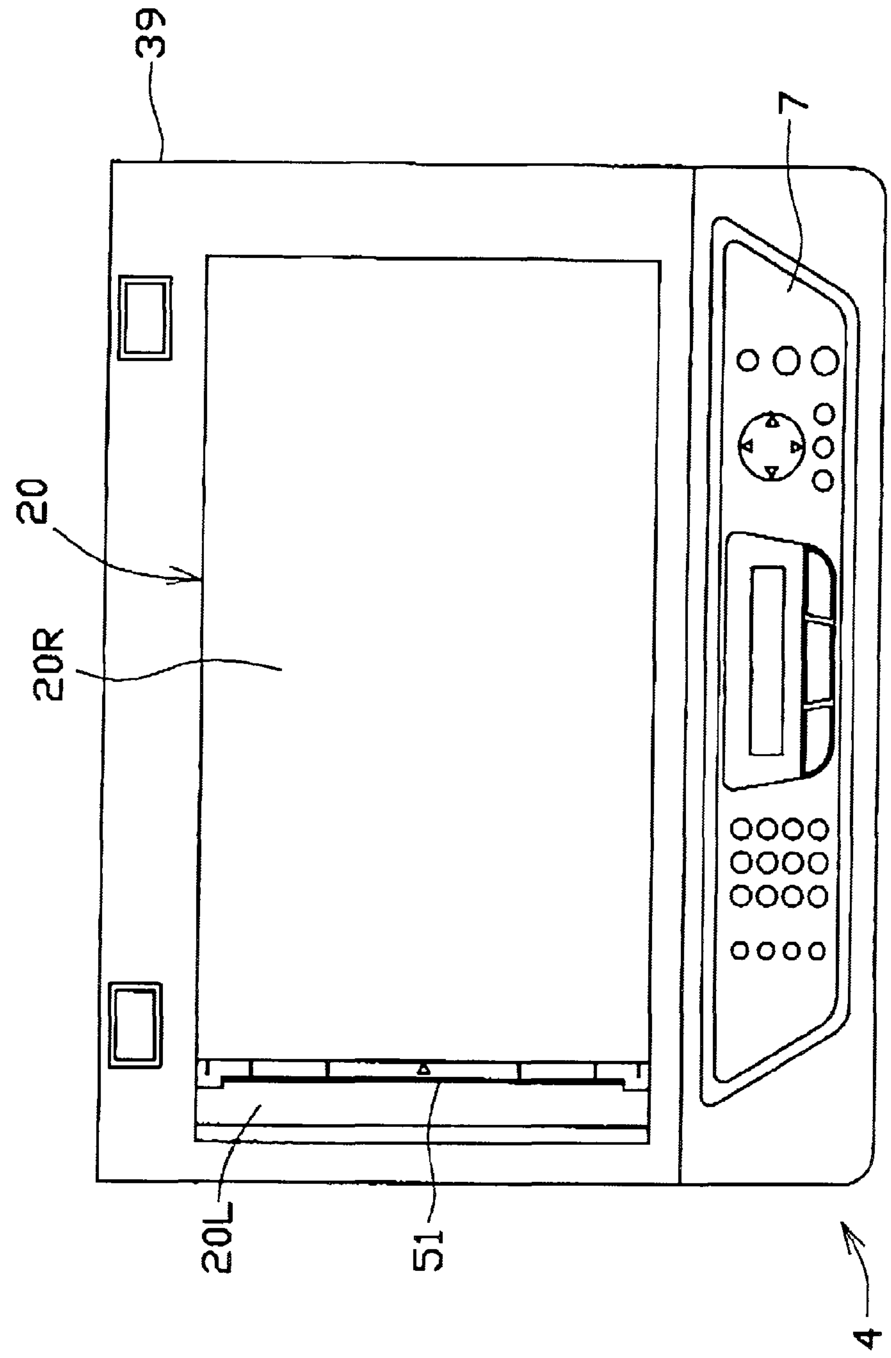
FIG. 3 is a schematic plan view of a reading table of the scanner portion.

As shown in FIGS. 2 and 3, the platen glass 20 is disposed at the upper surface of the reading table 4, and a document sheet is placed on the platen glass 20 in the case where the scanner portion 2 is used as a FBS. The platen glass 20 may be a transparent glass plate. A housing 39 of the reading table 4 has an opening at a center of an upper side thereof, in order to expose the platen glass 20 to the outside. The platen glass 20 has horizontal dimensions sufficiently larger than those of the opening. An area over which the platen glass 20 is exposed through the opening corresponds to a document reading area.

The reading unit 21 is incorporated inside the housing 39 of the reading table 4, or on a side of the platen glass 20 opposite to a document setting surface thereof on which a document is placed. The housing 39 is made of synthetic resin, and includes a support rib for supporting the platen glass 20, bosses for screwing various members to the housing 39, a through-hole for electrical wiring or for other purposes, and a partition plate dividing an internal space of the housing 39 into a portion in which the reading unit 21 is disposed and another potion in which a circuit board for the operator panel 7 is disposed. These parts or members may be suitably designed depending on how the reading table 4 is implemented, and detailed description thereof is omitted.

As shown in FIG. 2, the reading unit 21 includes a CIS unit 40 as an image reading device, a carriage 41 as a scanning device, and a scanning mechanism (not shown). The CIS unit 40 is an image sensor or image reading device of close-contact type including light sources 42, lenses 43, and light receiving elements 44. Light emitted from the light sources 42 toward the document sheet on the platen glass 20 is transmitted through the platen glass 20 to be reflected by the document sheet. The reflected light is concentrated on the light receiving elements 44 by the lenses 43, and the light receiving elements 44 convert the light into electrical signals. The light receiving elements 44 are arranged in a row in a width direction of the document sheet, i.e., an axial direction of the feeder roller 35, such that the light receiving elements 44 are grouped into a plurality of units thereof and each unit is mounted on a single chip. The light sources 42 and the lenses 43 are also arranged in respective rows in the same direction. As the light sources 42, LEDs (Light Emitting Diodes) of respective colors, namely, red (R), green (G), and blue (B), are used, according to the color separation technology. Hereinafter, the light sources 42 and light receiving elements 44 will be collectively referred to as a light source 42 and a light receiving element 44, respectively, where appropriate.

Figure 4:
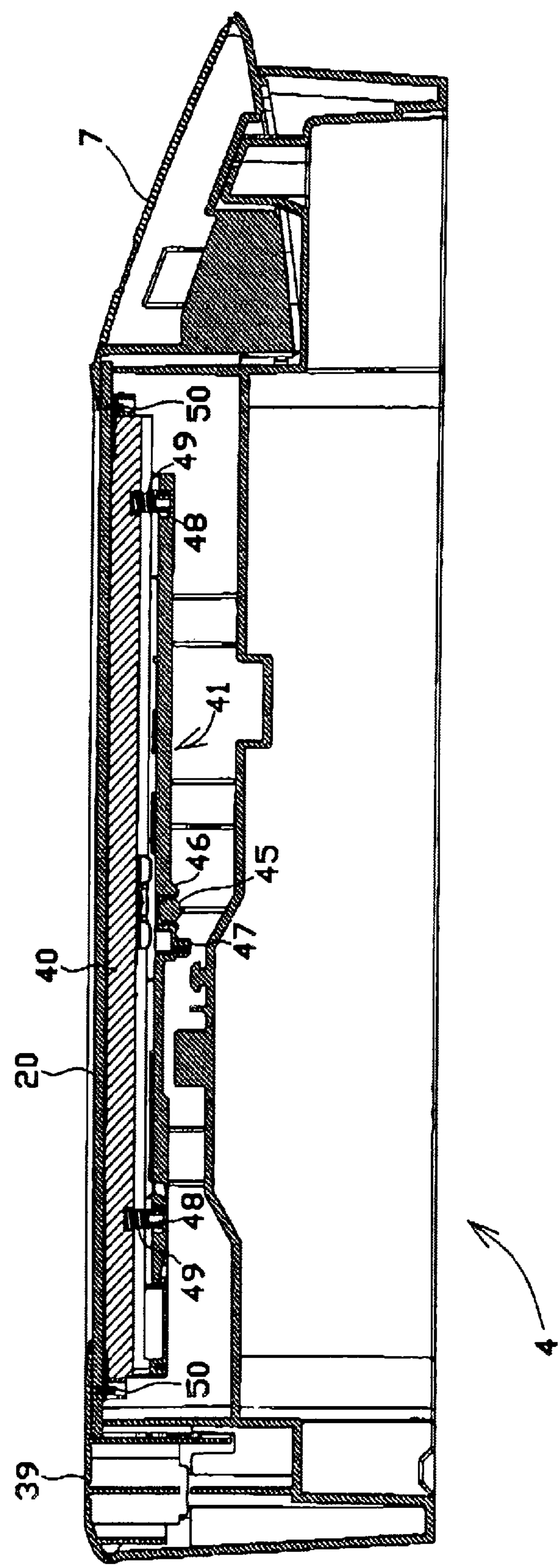
FIG. 4 is a vertical cross-sectional view of the reading table in which a carriage is disposed.

As shown in FIG. 4, the CIS unit 40 is mounted on the carriage 41 and held in contact with the platen glass 20. The carriage 41 is disposed to be capable of scanning or reciprocating under the platen glass 20 by being driven by the scanning mechanism in the form of a belt drive mechanism (not shown). The carriage 41 is engaged with a guide shaft 45 extending across a width of the housing 39 of the reading table 4, and is slid on and along the guide shaft 45 by the belt drive mechanism. By moving the carriage 41 along the guide shaft 45, the CIS unit 40 mounted in the carriage 41 and held in close contact with the platen glass 20 scans or is reciprocated along the surface of the platen glass 20.

Thus, the carriage 41 carries the CIS unit 40 thereon, as shown in FIG. 4. On an under surface of the carriage 41 is formed a shaft receiving portion 46 that is fitted on the guide shaft 45 from the upper side. With the shaft receiving portion 46 fitted on the guide shaft 45, the carriage 41 is supported and slidable on the guide shaft 45 along an axial direction thereof. A belt holding portion 47 is formed at a side of the shaft receiving portion 46, to protrude downward. The belt holding portion 47 holds a timing belt of the belt drive mechanism, thereby coupling the timing belt with the carriage 41. By this arrangement, a drive force is transmitted from the belt drive mechanism to the carriage 41, thereby moving the carriage 41 on and along the guide shaft 45. The belt drive mechanism is constructed, for instance, such that the timing belt is wound around a drive pulley and a driven pulley, and a drive force of a motor is input to a drive shaft of the drive pulley, so that the timing belt is circulated by rotation of the drive pulley.

On an internal side of the carriage 41 on which is mounted the CIS unit 40, two spring receiving portions 48 are disposed at respective positions separate in a lateral direction of the apparatus 1. Between the CIS unit 40 and the carriage 41 are interposed two coil springs 49 respectively positioned by the spring receiving portions 48. The coil springs 49 press the CIS unit 40 as mounted on the carriage 41, against the under surface of the platen glass 20, in order to hold the CIS unit 40 in close contact with the platen glass 20. At opposite two ends of the CIS unit 40, there are respectively disposed rollers 50 that allow the CIS unit 40 as pressed against the under surface of the platen glass 20 to smoothly move while held in close contact therewith, when the carriage 41 is moved.

As shown in FIG. 3, a partitioning member 51, which is a plate-like member long in a front-rear direction of the reading table 4, that is, an extending direction of the reading unit 21, is disposed on the platen glass 20 within the exposed area, in order to divide the exposed area into two sections in a lateral direction of the multifunctional apparatus 1. As shown in FIG.

2, the platen glass 20 extends such that an end portion thereof (i.e., a left end portion as seen in FIG. 2) is disposed under the feeder roller 35 to constitute a reading surface used when image reading is performed using the ADF 5.

An end portion of the platen glass 20, which is opposite the end portion serving as the reading surface when an image is read using the ADF 5, constitutes the document setting surface used when the scanner portion 2 is operated as a PBS. Thus, the partitioning member 51 divides in the lateral direction the exposed area of the platen glass 20 into two sections, namely, a fed-document reading area 20L functioning as the reading surface used in the case of reading an image using the ADF 5, and a stationary-document reading area 20R functioning as the document setting surface used in the case of reading an image by operating the scanner portion 2 as a FBS. When a document in the form of a sheet (hereinafter referred to as "document sheet") is placed on the stationary-document reading area 20R, the partitioning member 51 serves as a reference for positioning of the document sheet. On the partitioning member 51, there are put a plurality of marks including a center mark put on the partitioning member 51 at a longitudinal center thereof, and marks indicating positions of two opposite ends of document sheets of various sizes, such as A4 and B5, in the front-rear direction of the apparatus 1. When a document sheet is positioned on the stationary-document reading area 20R, the center mark serves as a fiducial point.

Figure 5:
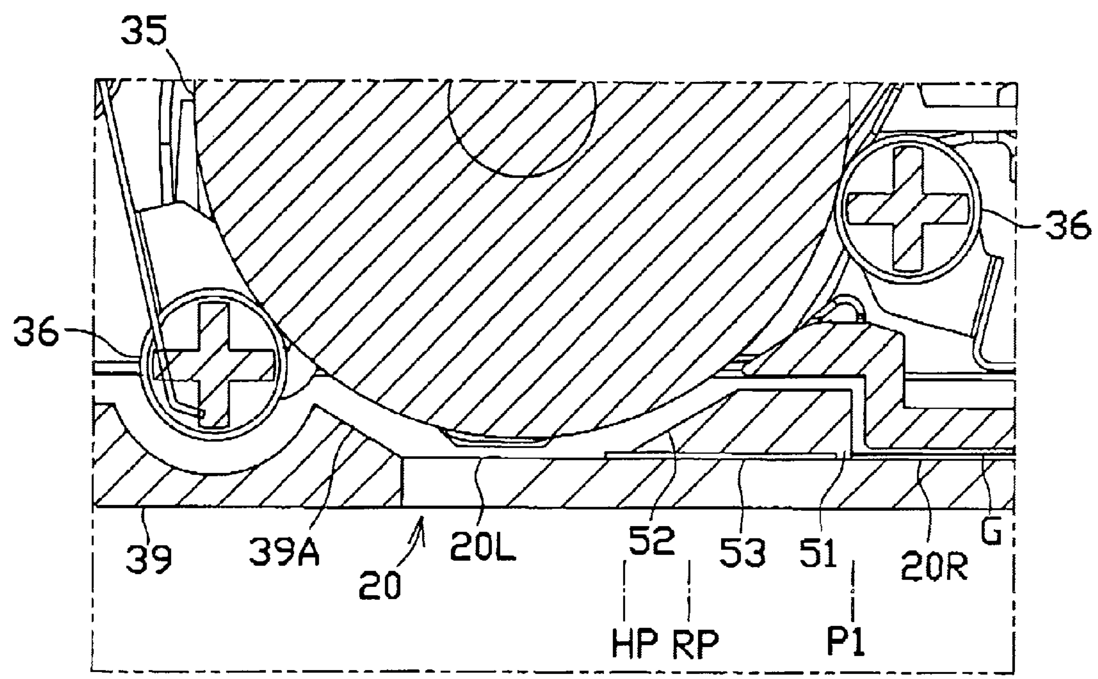
FIG. 5 is an enlarged cross-sectional view of the scanner portion, showing a reference member and its vicinity.

As shown in FIG. 5, a surface of the partitioning member 51 that is opposed to the document holding member 6 includes a guide surface 52. More specifically, the guide surface 52 is formed by gradually reducing a thickness of the partitioning member 51 at a portion of the partitioning member 51 that is opposed to the feeder roller 35, such that the guide surface 52 gradually approaches the platen glass 20 toward the fed-document reading area 20L. The guide surface 52 guides a leading edge of the document sheet supplied from the document supply tray 22, to the fed-document reading area 20L, before the document sheet reaches the feed pathway 26. Thus, feeding of the document sheet to the fed-document reading area 20L is smoothed. Further, since a plurality of members are integrated into a single member, that is, since it is made unnecessary to dispose a guide member that is separate from or not integrated with the partitioning member 51, the size and cost of the scanner portion 2 are reduced.

Another guide surface 39A is disposed on the downstream side, with respect to the feeding direction, of the fed-document reading area 20L. The afore-mentioned guide surface 52 is provided in order to guide the document sheet that is not yet read, to the fed-document reading area 20L, and thus a lowest portion of the guide surface 52 needs not be located at a level lower than the surface of the platen glass 20. On the other hand, the guide surface 39A on the downstream side of the fed-document reading area 20L is provided in order to guide the document sheet having been read, upward from the fed-document reading area 20L, and thus a lowest portion of the guide surface 39A is preferably located at a level lower than the surface of the platen glass 20, for the following reason. That is, if the lowest portion of the guide surface 39A protrudes from the platen glass 20, the leading edge of the document sheet having been read is brought into contact with the lowest portion of the guide surface 39A, which may cause paper jam.

That is, even if the lowest portion of the guide surface 52 of the partitioning member 51 protrudes from the platen glass 20, this protrusion does not cause paper jam. In other words, contact between the document sheet and the partitioning member 51 does not lead to paper jam. Hence, it is made unnecessary to divide the platen glass 20 into two parts corresponding to the fed-document reading area 20L and the stationary-document reading area 20R, to have the lowest portion of the guide surface 52 of the partitioning member 51 below the other part of the upper surface of the platen glass 20, and hence it is possible to provide the fed-document reading area 20L and the stationary-document reading area 20R by a single platen glass 20 and dispose the partitioning member 51 on the upper surface of the platen glass 20. Thus, the structure of the platen glass 20 and the partitioning member 51 is simplified, and the scanner portion 2 is easily assembled.

Figure 6:
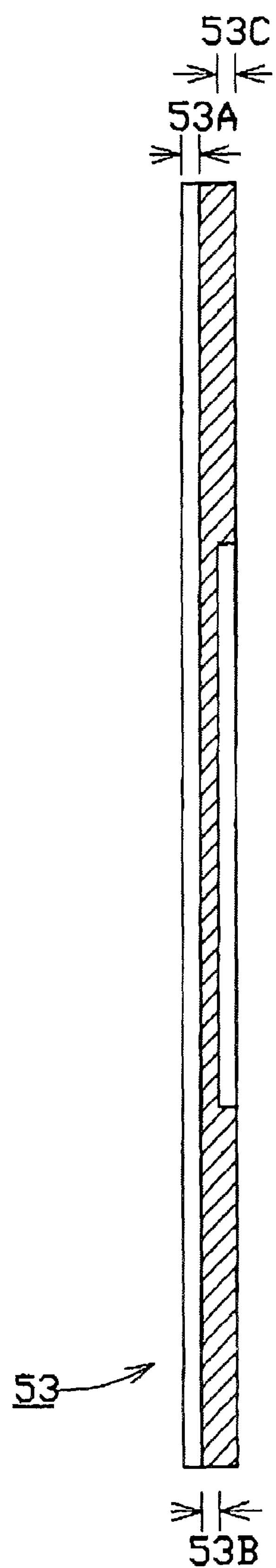
FIG. 6 is a plan view of the reference member.

As shown in FIG. 5, a reference member 53 is interposed between an under surface of the partitioning member 51 and the platen glass 20. The reference member 53 provides a luminosity reference with respect to the CIS unit 40. More specifically, the reference member 53 is a thin band-shaped member covering an almost entire length of the under surface of the partitioning member 51. As shown in FIG. 6, the reference member 53 has three areas arranged in an auxiliary scanning direction for the CIS unit 40, that is, the lateral direction as seen in FIG. 6. A left one 53A of the three areas is a white-colored area, and used for an adjustment of an amount of light emitted from the CIS unit 40 (which may be simply referred to as "the light amount adjustment" hereinafter), and for obtaining white level data. The amount of the light emitted from the CIS unit 40 may be adjusted by adjusting a time period during which the light is emitted, or by adjusting an intensity of the light, for instance. A middle one 53B of the three areas is a black-colored area, and used for obtaining black level data with respect to the CIS unit 40. A boundary between the left and middle areas 53A, 53B serves as a reference with respect to the auxiliary direction of the CIS unit 40. A right one 53C of the three areas is white-colored at an intermediate portion in the front-rear direction, and black-colored on the opposite sides of the white intermediate portion. The right area 53C serves as a reference with respect to a main scanning direction of the CIS unit 40. The reference member 53 is interposed between the partitioning member 51 and the platen glass 20, such that the areas 53A-53C extend in a direction parallel to the direction in which the CIS unit 40 extends.

By thus interposing the reference member 53 under the partitioning member 51, it is made unnecessary to leave a special space for disposing the reference member 53, at a left-hand end with respect to a range of scanning of the CIS unit 40 in the reading table 4, or outside the exposed area of the platen glass 20. Thus, the size of the reading table 4 can be reduced. By saving space particularly at the side where the fed-document reading area 20L is disposed in the width direction of the reading table 4, i.e., at the left side of the reading table 4 as seen in FIG. 3, the feeder roller 35 of the ADF 5 is disposed as close as possible to an extreme end in the width or lateral direction of the document holding member 6, thereby enabling to reduce the lateral or width dimension of the scanner portion 2. The width of the partitioning member 51 is substantially the same with that of the reference member 53, and thus relatively small, thereby reducing the exposed area of the platen glass 20. Thus, the whole area of the upper surface of the reading table 4 is made relatively small, reducing the overall size of the scanner portion 2.

Figure 7:
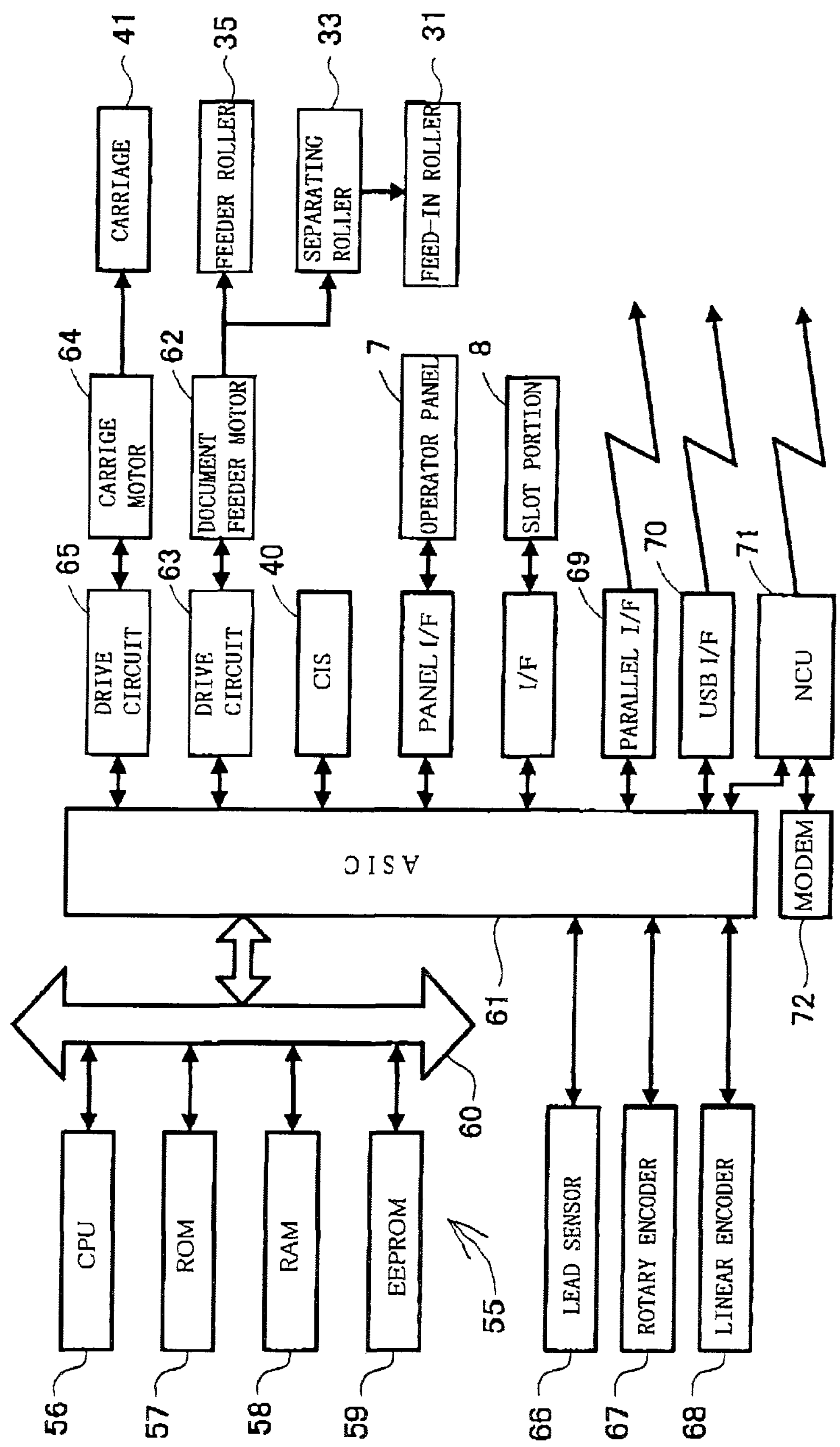
FIG. 7 is a black diagram of a control unit of the multifunctional apparatus.

FIG. 7 shows a structure of a control unit 55 of the multifunctional apparatus 1. The control unit 55 generally controls operation of the multifunctional apparatus 1, that is, the control unit 55 controls not only the scanner portion 2, but also the printer portion 3. Since description of constituent elements of the printer portion 3 is not essential in the present embodiment, the constituent elements are not shown in FIG. 7. The control unit 55 takes the form of a microcomputer principally constituted by a CPU 56, a ROM 57, a RAM 58, an EEPROM (Electrically Erasable and Programmable ROM) 59. The control unit 55 is connected to an ASIC (Application Specific Integrated Circuit) 61 via a bus 607 as shown in FIG. 7.

The ROM 57 stores programs according to which various operations of the multifunctional apparatus 1 are controlled, and others. The RAM 58 is used as a storage area or a working area for temporarily registering various kinds of data used when the CPU 56 executes the above-mentioned programs. For instance, the RAM 58 stores an adjusted value of a light amount of the light source 42 of the CIS unit 40, and the white level data and the black level data obtained by reading the reference member 53. The EEPROM 59 is a storage area for storing various settings, the statuses of flags, and other data that should be retained even after the multifunctional apparatus 1 is powered off. For instance, the EEPROM 59 stores a prescribed value of the light amount. The prescribed value is the adjusted value of the light amount which would be obtained if the CIS unit 40 implements the light amount adjustment (which will be fully described later) with respect to, or using, the reference member 53 while the document holding member 6 is closed. The prescribed value is set by default during the manufacturing, or at the factory shipment, of the multifunctional apparatus 1. The CPU 56, the ROM 57, the RAM 58, and the EEPROM 59 constitute an external-light detector.

The ASIC 61 generates signals including phase signals to be supplied to the LF motor or the document feeder motor 62, in response to commands from the CPU 56. The phase signals are sent to a drive circuit 63 of the document feeder motor 62 to control operation of the document feeder motor 62 by supplying drive signals to the document feeder motor 62 via the drive circuit 63.

The drive circuit 63 is for driving the document feeder motor 62 that is connected to the feed-in roller 31, the separating roller 33, and the feeder roller 35. That is, the drive circuit 63 generates, upon receiving an output signal from the ASIC 61, electrical signals for rotating the document feeder motor 62. Upon receiving the electrical signals, the document feeder motor 62 rotates, and the torque of the document feeder motor 62 is transmitted to the separating roller 33 and the feeder roller 35 via a well-known drive mechanism including a gear and a drive shaft.

Similarly, the ASIC 61 generates signals including phase signals to be supplied to a carriage motor or a CR motor 64, in response to commands from the CPU 56. The phase signals are sent to a drive circuit 65 of the CR motor 64 to control operation of the CR motor 64 by supplying drive signals to the CR motor 64 via the drive circuit 65.

The drive circuit 65 is for driving the CR motor 64 of the belt drive mechanism connected to the carriage 41, and generates electrical signals for rotating the CR motor 64 upon receiving an output signal from the ASIC 61. The CR motor 64 rotates upon receiving the electrical signals, and the torque of the CR motor 64 is transmitted to the carriage 41 via a well-known belt drive mechanism, in order to laterally move or reciprocate the carriage 41.

To the ASIC 61 are connected a lead sensor 66, a rotary encoder 67, and a linear encoder 68. The lead sensor 66 detects the document sheet in the feed pathway 26, the rotary encoder 67 detects an amount of rotation of the separating roller 33 and feeder roller 35, and the linear encoder 68 detects an amount of a movement of the carriage 41.

To the ASIC 61 is connected the CIS unit 40, which reads the image on the document sheet as fed along the feed pathway 26. In accordance with a control program stored in the ROM 57, the light amount adjustment, the acquisition of the white level data and black level data, and the image reading are performed.

To the ASIC 61 are further connected: the operator panel 7 through which instructions related to operations of the multifunctional apparatus 1 are inputted; the slot portion 8 into which various kinds of small memory cards are inserted; a parallel interface 69 and a USB interface 70 each connected, via a parallel cable and a USB cable, respectively, to an external device such as personal computer, to allow data transfer therebetween; a NCU (Network Control Unit) 71 implementing the facsimile function; and a MODEM 72.

There will be now described an operation to read an image using the scanner portion 2.

When the scanner portion 2 is used as a FBS, the document holding member 6 is turn-opened and a document is placed on the platen glass 20 within the stationary-document reading area 20R. Then, the document holding member 6 is turn-closed, to fix the document in position on the platen glass 20. Thereafter, a user presses a start button in the operator panel 7, thereby having the control unit 55 operate the carriage 41 to move along the platen glass 20. While the carriage 41 is thus moved, the CIS unit 40 reads an image on the document placed within the stationary-document reading area 20R on the platen glass 20.

On the other hand, when the ADF 5 is to be used for reading an image on a document, the document holding member 6 is closed with respect to the reading table 4, and then the document is set in the document supply tray 22. The document may be a single sheet, or a plurality of sheets. For instance, where images on a respective plurality of document sheets of a same size are to be read, the document sheets are stacked and trued up, and an end portion of the stack is inserted from the document supply tray 22 into the feed-in chute 29.

Then, a user presses the start button of the operator panel 7, thereby having the control unit 55 operate a motor to rotate the feed-in roller 31, the separating roller 33, and the feeder roller 35, at predetermined timings. Then, a downmost one of the document sheets which one directly contacts the feed-in roller 31 and separating roller 33 that are rotating is separated from the other document sheets and supplied into the feed pathway 26, and this is repeated so that the document sheets are sequentially supplied into the feed pathway 26 one by one. The supplied document sheet is then fed along the feed pathway 26 down to the fed-document reading area 20L, where the image on the document sheet is read by the CIS unit 40 held stationary under the fed-document reading area 20L. The document sheet whose image has been read is ejected from the ejecting chute 38 onto the catch tray 23.

In the above-described image reading operation involving the scanner portion 2, before the CIS unit 40 initiates the reading the image on the document, there are implemented an adjustment of an output of the CIS unit 40, namely, the adjustment of the light amount of the light source 42 (i.e., the light amount adjustment), the acquisition of the white level data and black level data, and an external light detection.

Referring now to FIGS. 5-12, there will be described in detail the image reading operation. Initially, the control unit 55 moves the carriage 41 to a reference position RP. This reference position RP corresponds to the boundary between the white left area 53A and the black middle area 53B in the reference member 53, and detectable by detecting a change in signals representing colors and outputted from the CIS unit 40. Namely, when the output of the CIS 40 changes from a signal representative of the white color to a signal representative of the black color, it is determined that the boundary between the white left area 53A and black middle area 53B is detected. Then, prior to the image reading, the carriage 41 is moved to a position under the reference member 53, that is, to a home position HP shown in FIG. 5. The home position HP corresponds to the white area 53A in the reference member 53. Thus, a position corresponding to the reference member 53 is determined to be the home position HP, which is a standby position of the CIS unit 40. Hence, a distance by which the carriage 41 is moved prior to initiation of the light amount adjustment using the reference member 53 is reduced, enabling to quickly initiate the image reading upon request.

Figure 9A:
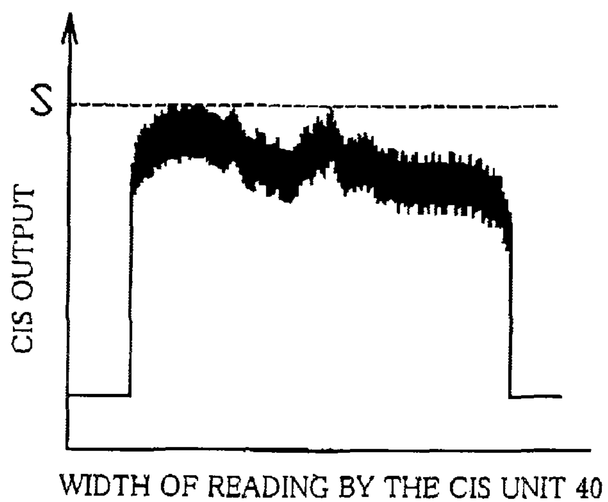
FIG. 9A is a graph of an output of the CIS unit as adjusted by implementing a light amount adjustment.

An operation of the control unit 55 to implement the image reading operation will be described by referring to a flowchart of FIG. 8 illustrating the aforementioned control program, or an image reading operation routine, executed by the control unit 55. The routine or control flow is initiated with step S1 in which the control unit 55 operates to implement the light amount adjustment for the light source 42 of the CIS unit 40, by using the reference member 53. More specifically, the white area 53A of the reference member 53 is initially irradiated with light in a sufficiently large amount emitted from the light source 42. At this time, an amount of the reflected light from the white area 53A and accordingly an output of the light receiving element 44 of the CIS unit 40 is low. The amount of the light emitted from the light source 42 is stepwise increased until the output of the light receiving element 44 (which may be referred to as "the output of the CIS unit 40" or "the CIS output" hereinafter) reaches a desired value S, as shown in FIG. 9A. The control flow then goes to step S2 in which the amount of the light as emitted from the light source 42 at the moment when the CIS output becomes the desired value S is determined to be the adjusted value of the light amount, and the adjusted value is stored in the RAM 58.

Subsequently, the control flow goes to steps S3 and S4 in which the control unit 55 operates to obtain the white level data and the black level data of the CIS unit 40 with respect to the reference member 53. More specifically, in step S3, the white level data is obtained such that the control unit 55 operates the light source 42 of the CIS unit 40 to emit light in an amount of the adjusted value toward the white area 53A of the reference member 53 while the carriage 41 is located at a position corresponding to the white area 53A, and the reflected light from the white area 53A is converted, by the light receiving element 441 into electrical signals as the white level data. The acquisition of the white level data may be implemented a plurality of times for the white area 53A, to obtain a plurality of values so that an average of the values is used as the white level data. Where the acquisition of the white level data is implemented a plurality of times, this repetitive acquisition may be made while the carriage 41 is moved within a range corresponding to the white area 53A.

After the acquisition of the white level data in step S3, the control unit 55 operates the CR motor 64 to move the carriage 41 to a position corresponding to the black area 53B of the reference member 53. Then, in the following step S4, the black level data is obtained from electrical signals outputted from the light receiving element 44 by reading the black area 533 while the light source 42 is of or does not emit light. Like in the case of obtaining the white level data, the acquisition of the black level data may be implemented a plurality of times, and the obtaining the black level data a plurality of times may be performed while the carriage 41 is moved within a range corresponding to the black area 53B. The order in which the white level data and the black level data are obtained may be reverse. The control flow then goes to step S5 in which the thus obtained white and black level data are stored in the RAM 58, and to be used as reference data in a shading correction during the image reading.

Figure 12:
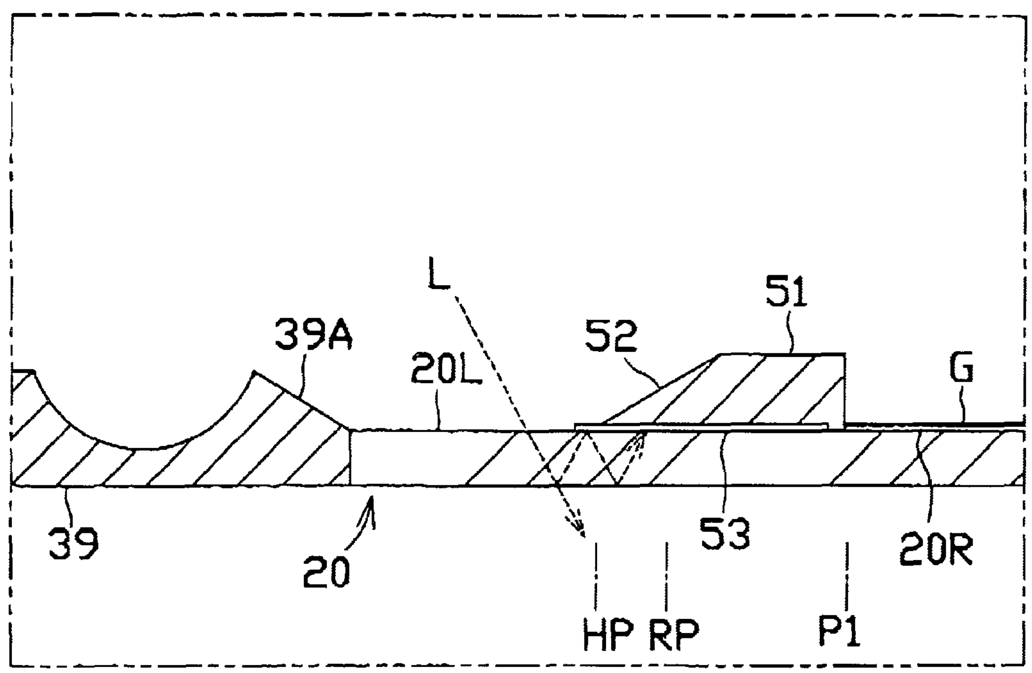
FIG. 12 is a cross-sectional view showing in enlargement the reference member and its vicinity, in a state where a document holding member of the scanner portion is open.

Subsequently, the control flow goes to step S6 in which the control unit 55 operates to detect whether external light L is incident on or entering the reading table 4. More specifically, when the document holding member 6 is turn-opened, an area of the platen glass 20 partially constituting the upper surface of the reading table 4 is exposed to the exterior, as shown in FIG. 12, and external light L enters the reading table 4 through the exposed area of the platen glass 20. The scanner portion 2 is used as a FBS and external light L enters the reading table 4 through the exposed area of the platen glass 20 during image reading is performed, for instance when a book document or other relatively thick documents is placed on the platen glass 20, making it impossible to completely close the document holding member 6, or when a part of a document larger than the stationary-document reading area 20R on the platen glass 20 is to be read and the document holding member 6 is purposely kept opened to enable an operator to hold in position the part desired to be read. While the document holding member 6 is open as shown in FIG. 12, the fed-document reading area 20L is held exposed, allowing the external light L to enter the reading table 4 through the platen glass 20 at the fed-document reading area 20L. On the other hand, while the document holding member 6 is closed as shown in FIG. 5, the platen glass 20 is covered by the document holding member 6, inhibiting entrance of the external light L into the reading table 4.

Figure 10:
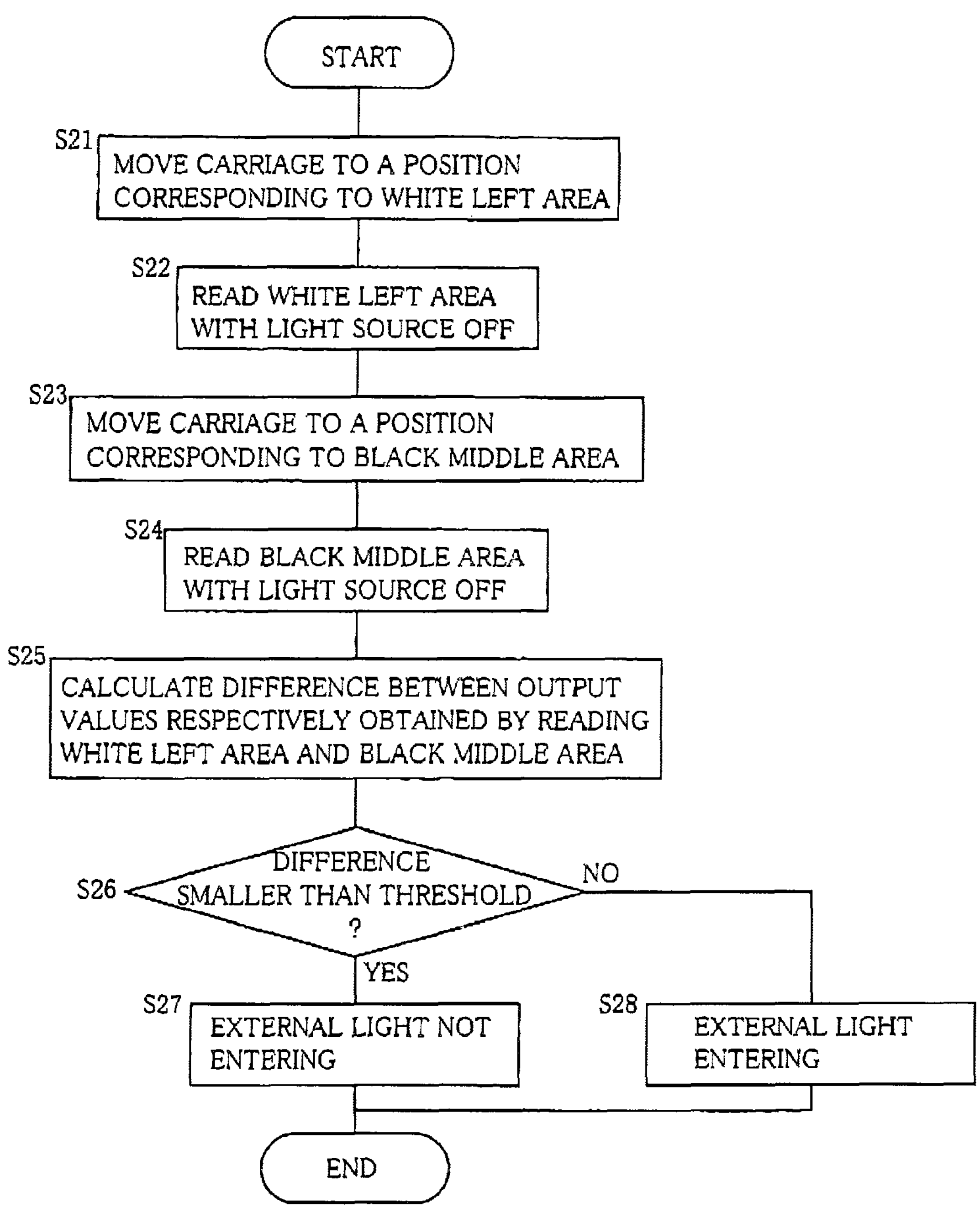
FIG. 10 is a flowchart illustrating an external light detection routine according to the first embodiment.

Since the CIS unit 40 is disposed inside the reading table 4, the entrance of the external light L can be detected, by emitting light from the light source 42 of the CIS unit 40 toward the reference member 58 and reading the reflected light from the reference member 53, as described in detail later. By referring to a flowchart of FIG. 10 illustrating an external light detection routine, the detection of external light will be described. The external light detection routine or control flow begins with step S21 in which the control unit 55 moves the carriage 41 to locate the CIS unit 40 at a position corresponding to the white left area 53A of the reference member 53. Then, the control flow goes to step S22 in which the light source 42 of the CIS unit 40 is turned off to read the white area 58A. A value of the CIS output as obtained by the reading the white area 53A is stored, as data related to the white area 53A, in the RAM 58.

Subsequently, the control flow goes to step S23 in which the control unit 55 moves the carriage 41 to locate the CIS unit 40 at a position corresponding to the black middle area 53B of the reference member 53. Then, the control flow goes to step S24 in which the light source 42 of the CIS unit 40 is turned off, and the black area 53B is read. A value of the CIS output obtained by the reading the black area 53B is stored, as data related to the black area 53B, in the RAM 58.

Then, the control flow goes to step S25 in which the control unit 55 calculates a difference between the value obtained by the reading the white area 53A and the value obtained by the reading the black area 53B, that are stored in the RAM 58. The control flow then goes to step S26 in which the control unit 55 determines whether the difference is not smaller than a predetermined threshold. When the document holding member 6 is closed relative to the reading table 4, the document holding member 6 blacks the external light L, i.e., the external light L does not enters the reading table 4. Hence, a space inside the reading table 4 is dark. In this state, when the CIS unit 40 reads the white area 53A and the black area 53B of the reference member 53 with the light source 42 off, there is no reflected light coming from either of the white and black areas 53A, 53B. Thus, both the values of the CIS output for the white and black areas 53A, 53B become almost equal to the value of the black level data denoted by N in the graphs of FIG. 11A. Hence, when the difference between the values obtained by the reading the white and black areas 53A, 53B, respectively, is smaller than the predetermined threshold, the control unit 55 makes an affirmative decision (YES) in step S26, that is, determines that the external light L is not entering the reading table 4 in step S27.

On the other hand, when the document holding member 6 is open relative to the reading table 4, the external light L enters the reading table 4. In this case, when the CIS unit 40 reads the white area 53A and the black area 53B of the reference member 53 with the light source 42 off, the external light L entering the reading table 4 is incident on and read by the CIS unit 40 Further, the external light L is reflected at the white area 53A and the black area 53B, respectively, and beams of the reflected light are read by the CIS unit 40. The left area 53A that is white in color has a relatively large reflectivity, and the reflected light from the white area 53A as well as the external light L incident on the CIS unit 40 affect the CIS output. That is, a value N1 of the CIS output is obtained as a result of the reading the white area 53A, as shown in FIG. 11B. On the other hand, the black area 53B black in color has a relatively small reflectivity, and only the external light L incident on the CIS unit 40 affects the value of the CIS output obtained by the reading the black area 53B. That is, a value N2 smaller than the value N1 is obtained by the reading the black area 53B. That is, a difference occurs in the CIS output, which difference corresponds to a difference in reflectivity between the white area 53A and the black area 53B. Hence, when a difference between the CIS output values as obtained by the reading the white and black areas 53A, 53B, respectively, is not smaller than a predetermined threshold, the control unit 55 makes a negative decision (NO) in step S26, that is, determines that external light L is entering the reading table 4, in step S28.

The aforementioned difference between the CIS output values obtained for the white and black areas 53A, 53B, which difference is acquired in the step (S25) of detecting external light, may take the form of a difference between a maximum one of a plurality of values obtained by reading the white area 53A, and a maximum one of a plurality of values obtained by reading the black area 53B.

Alternatively, the external light detection may be implemented as follows. That is, a value of the CIS output is obtained by reading each unit area in a line in the white area 53A, and a value of the CIS output is obtained by reading each unit area in a line in the black area 53B. Each unit area is an area read by one of the light receiving elements 44. A difference between each pair of unit areas at the same position in the respective lines in the white and black areas 53A, 53B is calculated. A maximum one of the thus obtained differences, or alternatively an average of the differences, is employed as the difference to be compared with the predetermined threshold. When the maximum difference or the average is not smaller than the predetermined threshold, it is determined that external light L is entering the reading table 4.

Further alternatively, the external light detection may be implemented as follows The differences for all the pairs of unit areas between the two lines in the left and middle areas 53A, 53B are initially obtained in the same way as described above, and then pairs of unit areas between which the differences are not smaller than the predetermined threshold are counted. The thus obtained count is compared with a preset reference number, and it is determined that external light is entering when the count is not smaller than the reference number.

In each of the above-described methods, the predetermined threshold is suitably determined by taking account of various factors including adjustment of the CIS output. For instance, the threshold may be set in the EEPROM 59 during the manufacturing of the multifunctional apparatus 1 or at the factory shipment thereof. Data representative of the presence or non-presence of external light L entering the reading table 4, as detected by the control unit 55, is stored in the RAM 58.

Referring back to the flowchart of FIG. 8, after the external light detection is complete in step S7, the control unit 55 moves the carriage 41 to a reading initiation position P1 in the stationary-document reading area 20R, from which the scanner portion 2 initiates reading the image, when functioning as a FBS. When it has been determined in step S7 that external light is not entering the reading table 4, the control flow goes to step S8 in which the control unit 55 sets to use the adjusted value having been obtained with respect to the reference member 53, as the value of the amount of the light emitted from the light source 42 during image reading, i.e., while the carriage 41 is reciprocated along the platen glass 20 and the light receiving element 44 converts the reflected light received from the document into electrical signals. That is, in the case where external light L is not entering the reading table 4 during the image reading, the condition regarding external light L has not been changed since the light amount adjustment was implemented for the light source 42 in step S1. In other words, neither the light amount adjustment nor the image reading is affected by external light L. Hence, when the image reading is implemented such that the light source 42 emits, toward the document to be read, light in the amount of the adjusted value as having been obtained in the light amount adjustment, the CIS output values obtained by reading a white portion and a black portion of the document, respectively, become the same as those obtained by reading the white and black areas 53A, 53B of the reference member 53, respectively, in the light amount adjustment of step S1.

On the other hand, when it is determined in step S7 that external light L is entering the reading table 4, the control flow goes to step S9 in which the control unit 55 sets to use the prescribed value stored in the EEPROM 59, as the value of the amount of the light emitted from the light source 42 during image reading, i.e., while the carriage 41 is reciprocated along the platen glass 20 and the light receiving element 44 converts the reflected light received from the document into electrical signals. In such a case where external light L is entering the reading table 4, the above-described light amount adjustment implemented for the light source 42 in step S1 has been affected by the external light L.

More specifically, a part of the external light L is reflected in the platen glass 20 as well as by a member inside the reading table 4, and finally incident on the reference member 53 and on the CIS unit 40 located at the home position HP. In particular, since the CIS unit 40 is disposed such that the light receiving element 44 faces upward, as shown in FIG. 2, external light L incident on the CIS unit 40 from the upper side thereof tends to affect the CIS output value. Hence, in a case where the light amount adjustment has been implemented while external light L is entering the reading table 4, the CIS output during the image reading is made to take the predetermined desired value S (shown in FIG. 9B), by setting the amount of the light emitted from the light source 42 during the image reading smaller than the amount that would be employed in the case where the external light has not been entering the reading table 4 in the light amount adjustment, by an amount corresponding to an amount of an amount of the external light L, since an amount of light received by the light receiving element 44 is a sum of an amount of the reflected light and an amount of the external light L. In other words, the adjusted value of the amount of the light emitted from the light source 42 is determined to have the CIS output at a value S1 which is indicated by two-dot chain line in FIG. 9B and lower than the level for making the CIS output the predetermined desired value S, by an amount corresponding to the amount of the external light L.

Figure 9B:
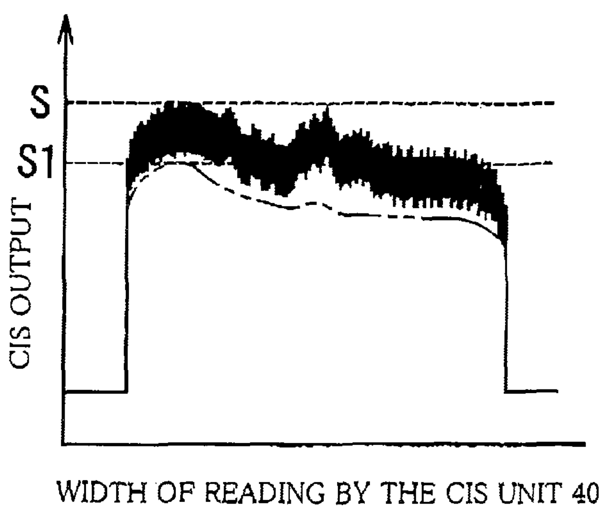
FIG. 9B is a graph of the CIS output as adjusted by the light amount adjustment in the case where external light is entering the reading table.

On the other hand, the reading initiation position P1 in the stationary-document reading area 20R is considerably apart from the fed-document reading area 20L, as shown in FIG. 12, and image reading does not tend to be affected by external light L while the carriage 41 is moved within the area corresponding to the stationary-document reading area 20R Hence, when the amount of the light emitted from the light source 42 toward the document is at the adjusted value obtained with respect to the reference member 53, that is, at the light amount value that makes the CIS output the value S1 (as shown in FIG. 9B), the amount of the light received by the light receiving element 44 at the stationary-document reading area 20R becomes smaller than the value S by an amount corresponding to the amount of the external light L.

In this case, where the light having the amount of the adjusted value that makes the CIS output the value S1 is emitted from the light source 42 toward the document, the CIS output values respectively obtained by reading the white and black portions of the document become lower than those obtained by reading the white and black areas 53A, 53B of the reference member 53, respectively, thereby making the read image blackish or darker than expected as a whole Therefore, the prescribed value stored in the EEPROM 59 is employed, instead of the value obtained as the "adjusted value" under influence of the external light L, as the amount of the light emitted from the light source 42. Thus, the light source 42 can emit light at the amount of the adjusted value that would be obtained in the light amount adjustment if external light L is not entering the reading table 4, even though external light L is actually entering the reading table.

The control flow then goes to step S10 in which the control unit 55 implements a shading correction with respect to data that is sequentially outputted from the CIS unit 40 while the carriage 41 is moved. More specifically, the CIS output is A/D converted, and the obtained digital signals are subjected to a shading correction based on the reference data stored in the RAM 58. The reference data includes the white level data and the black level data. The white level data has been obtained by irradiating the white area 53A of the reference member 53 with light emitted from the light source 42 at the amount of the adjusted value that had been obtained by the light amount adjustment irrespectively of whether the document holding member 6 had been open or closed during the light amount adjustment. The black level data has been obtained by reading the black area 53B with the light source 42 off.

In the case where external light L is not entering the reading table 4 during the image reading operation, external light L does not affect the light amount adjustment for obtaining the adjusted value of the amount of the light emitted from the light source 42, or the light amount adjusted with respect to the reference member 53, and further, neither the acquisition of the white level data and the black level data with respect to the reference member 53, nor the image reading are affected by external light L. Hence, the adjusted value of the amount of the light emitted from the light source 42 is employed in the acquisition of the white and black level data and in the image reading, without causing any problems.

Figure 9C:
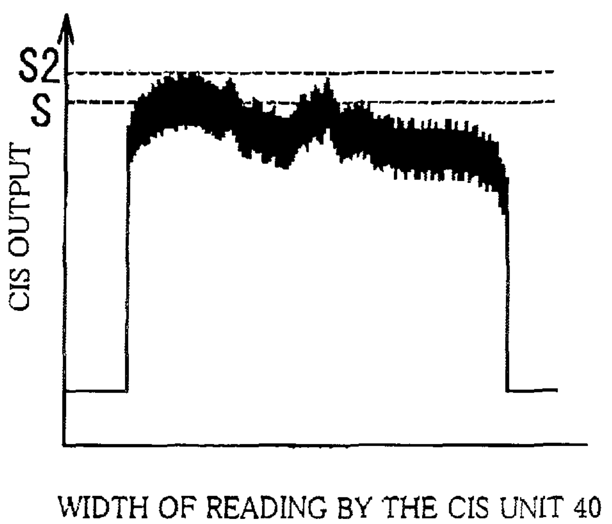
FIG. 9C is a graph of the CIS output obtained where external light is entering the reading table and the amount of the light emitted from the light source is at a prescribed value.

In the other case where external light L is entering the reading table 4 during the image reading operation, the light amount adjustment, i.e., the acquisition of the value adjusted with respect to the reference member 53, is affected by the external light L. However, the acquisition of the white level data and the black level data is implemented with respect to the reference member 53 as being equally affected by the external light L to the light amount adjustment. Hence, in an assumed case where the white level data and the black level data are obtained by irradiating the reference member 51 with light emitted from the light source 42 at the amount of the prescribed value, the CIS output would take a value S2 that is higher, by an amount corresponding to the external light L, than the desired value S, in the acquisition of the white level data. The value S2 is schematically indicated in the graph of FIG. 9C. That is, in this assumed case, the CIS output would seemingly take the value S2 that is a sum of the value S desired to be obtained when reading the white area 53A, and a value corresponding to the external light L, in the white level data acquisition.

Meanwhile, reading the image on the document does not tend to be affected by external light L, as described above, and hence the level of the CIS output will be actually equal to the value S when reading the white portion in the document with the document irradiated with the light in the amount of the prescribed value. If the shading correction is implemented for the thus obtained CIS output, using, as a reference data, the white level data having been obtained in the light amount adjustment in which the value S2 was obtained, the read image would undesirably become darker as a whole.

For the above reasons, in the case where the external L is entering the reading table 4 during the image reading operation, the white level data with respect to the reference number 53 is obtained by emitting from the light source 42 light in the amount of the adjusted value having been obtained by implementing the light amount adjustment with respect to the reference member 53 while the reference member 53 is affected by the external light L. In this way, the reference data taking the presence of the entering external light L into consideration can be obtained, by irradiating the reference member 53 with light in a suitable amount.

Data of the CIS output having been subjected to the shading correction in step S10 is handled as image data, and is stored in the RAM in the subsequent step S11. The control unit 55 therewith terminates the image reading, returns the carriage 41 to the home position HP, and sets the carriage 41 in a standby mode.

As described above, the scanner portion 2 of the multifunctional apparatus 1 is constructed such that the CIS unit 40 reads the white and black areas area 53A, 53B of the reference member 53 with its light source 42 off, in order that the control unit 55 determines whether external light L is entering the reading table 4 based on the difference between the values respectively obtained by reading the white and black areas 53A, 53B. That is, when the document holding member 6 is closed and external light is not entering the reading table 4, the values respectively obtained by reading the white and black areas 53A, 53B are equal to each other, and when the document holding member 6 is open and external light is entering the reading table 4, there is found a difference between the values obtained by reading the white and black areas 53A, 53B due to the difference in reflectivity between these areas 53A, 53B with respect to the external light incident on the areas 53A, 53B. Hence, it can be determined that external light is entering the reading table when the difference between the values obtained by reading the white and black areas 53A, 53B is not smaller than the predetermined threshold.

In this way, external light L entering the reading table 4 can be detected without using any sensor provided specially for external light detection, thereby reducing the size and cost of the multifunctional apparatus 1.

In the present embodiment, a close-contact type image sensor in the form of the CIS unit 40 is employed as the image reading device. However, the image sensor or image reading device may not be of close-contact type, but may be a CCD image sensor of a miniaturized optical system, for instance. However, where the image reading device is a close-contact type image sensor, the effect of the invention that external light can be detected without using a special sensor disposed in the multifunctional apparatus 1 is relatively significant, for the following reason. That is, a light source of a close-contact type image sensor is often low in illuminance, and is typically a LED. When such a low-illuminance light source is used as the light source of the image reading device, external light tends to adversely affect reading by the CIS unit 40.

In the present embodiment, the result of the external light detection, i.e., the information on whether external light L is entering the reading table 4 or not, is utilized in determining whether the adjusted value having been obtained in the light amount adjustment is to be used as the value of the amount of the light to be emitted from the light source 42 during the image reading. However, usage of the result of the external light detection is not limited thereto, but may be otherwise.

In the present embodiment, the external light detection is implemented after the adjustment of the CIS output, i.e., the light amount adjustment, which is implemented at initiation of an image reading operation. However, the timing at which the external light detection is implemented is not limited thereto. For instance, it may be arranged such that the external light detection is implemented in a preset cycle while the multifunctional apparatus 1 is powered on, and when initiation of an image reading operation is instructed in the presence of entering external light, the light amount adjustment is not implemented and the prescribed value, or alternatively an adjusted value previously obtained, is used as the value of the amount of the light emitted from the light source 42 during the image reading is performed.

Although in the present embodiment the prescribed value of the light amount is preset in the EEPROM 59 during the manufacturing or at the factory shipment of the multifunctional apparatus 1, this is not essential. For instance, it may be alternatively arranged such that an adjusted value of the light amount is obtained when the control unit 55 determines that external light is not entering the reading table 4, and the thus obtained adjusted value is used as the prescribed value in an image reading operation thereafter.

In the present embodiment, the ADF 5 is configured such that the catch tray 23 is disposed above the document supply tray 22 so that the document sheet is fed upward along the sideways U-shaped feed path and the guide surface 52 in the partitioning member 51 guides the document yet to be read, to the fed-document reading area 20L. However, the ADF 5 may be configured such that the document supply tray 22 is disposed above the catch tray 23 so that the document sheet is fed downward along a U-shaped feed path and the guide surface 52 of the partitioning member 51 guides the document sheet, as having been read, from the fed-document reading area 20L to the catch tray 23. Similarly to the above-described embodiment, this arrangement enables the smooth feeding of the sheet document from the fed-document reading surface 20L to the catch tray 23, as well as the reductions in the size and cost of the multifunctional apparatus 1, by integration of a plurality of components, i.e., a guide member and a partitioning member.

There will be described other embodiments of the invention, that have a lot in common with the first embodiment, and thus the elements or parts corresponding to those of the first embodiment will be denoted by the same reference numerals and description thereof is omitted Further, a part of operations and effects of the following embodiments that is common with those of the first embodiment will not be described or only briefly described, for avoiding redundancy.

Second Embodiment

There will be now described an image reading apparatus according to a second embodiment of the invention.

In the first embodiment, the white area 53A and the black area 53B of the reference member 53 are read while the light source 42 of the CIS unit 40 is off, and whether external light is entering the reading table or not is determined based on the difference between the values of the CIS output that are obtained by reading the white area 53A and the black area 53B, respectively, as shown in FIG. 10. In the second embodiment, however, a reference member 53 is read while a light source 42 of a CIS unit 40 is on, that is, while the light source 42 emits light to irradiate the reference member 53, and whether external light is entering a reading table 4 or not is determined based on the thus obtained values of the CIS output. Other than this, the structure of the multifunctional apparatus 1 according to the second embodiment is identical with that of the first embodiment.

There will be described operation of the scanner portion 2 of the image reading apparatus according to the second embodiment. In the second embodiment, the scanner portion 2 is used in the same way as in the first embodiment, in either of the cases where the scanner portion 2 is used as a FBS and where an ADF 5 is used. Further, the image reading operation by the scanner portion 2 according to the second embodiment is generally identical with that according to the first embodiment. That is, before the CIS unit 40 initiates reading an image on a document sheet, an output of the CIS unit 40 is adjusted, namely, the light amount adjustment for adjusting the CIS output (i.e., the adjustment of the amount of light emitted from the light source 42) and the acquisition of the white level data and black level data are implemented, and the external light detection is implemented, as shown in the flowchart of FIG. 8.

Figure 13:
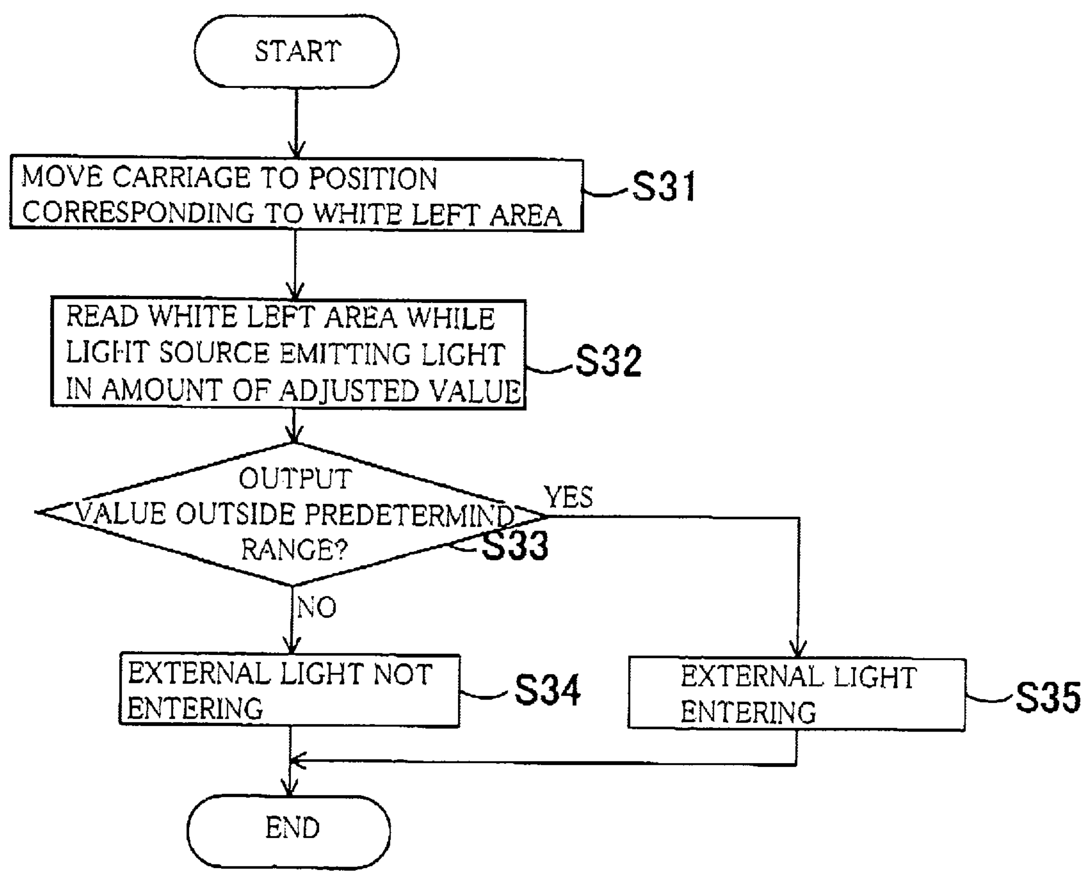
FIG. 13 is a flowchart illustrating an external light detection routine according to a second embodiment of the invention.

Referring now to a flowchart of FIG. 13 illustrating an external light detection routine according to the second embodiment, an operation to detect external light entering the reading table 4 will be described in detail. The external light detection routine of FIG. 13 corresponds to step S7 in the image reading operation routine of FIG. 8. The external light detection routine begins with step S31 in which the control unit 55 moves a carriage 41 in order that the CIS unit 40 is located at a position corresponding to a white left one 53A in three areas of a reference member 53. The routine or control flow then goes to step S32 in which the control unit 55 makes the CIS unit 40 read the white area 53A of the reference member 53 while the light source 42 of the CIS unit 40 irradiates the white area 53A with light in an amount of a prescribed value as stored in an EEPROM 59.

The prescribed value of the light amount is an adjusted value thereof that would be obtained when a document holding member 6 is closed and external light L is not entering the reading table 4. Hence, when the light source 42 is operated to emit light at the amount of the prescribed value toward the white area 53A of the reference member 53 while external light L is not entering the reading table 4, the CIS output substantially takes a desired value S as shown in FIG. 9A, even though possibly slightly deviating therefrom due to instability in the operation of the light source 42 and the light receiving element 44, and for other reasons.

On the other hand, where external light L is entering the reading table 4, the value of the CIS output obtained by reading the white area 53A of the reference member 53 while the light source 42 emits light in the amount of the prescribed value toward the white area 53A, becomes a sum of a quantity corresponding to the light emitted from the light source 42 and reflected by the white area 53A, a quantity corresponding to the external light L, and a quantity corresponding to the external light L as reflected by the white area 53A. That is, in addition to the light emitted from the light source 42 and reflected by the white area 53A, the external light L entering the reading table 4 is also incident on the CIS unit 40 to be read thereby, and furthermore, the external light L as reflected by the white area 53A is also read by the CIS unit 40. Hence, the CIS output takes a value that is higher, by an amount corresponding to the external light L, than the value S, which is desired to be obtained when reading the white area 53A, and schematically denoted by reference symbol S2 in FIG. 9C by way of example.

The control flow then goes to step S33 in which the control unit 55 operates to determine whether the value of the CIS output obtained by reading the white area 53A while the light source 42 emits the light in the amount of the prescribed value, falls outside a predetermined range or not For instance, this range may be determined by multiplying the value S by a predetermined coefficient, and preset in the EEPROM 59. Alternatively the range may be determined by obtaining and storing in the EEPROM 59 the adjusted value of the light amount when external light is not entering the reading table 4, and multiplying the adjusted value by a predetermined coefficient. When it is determined in step S33 that the CIS output obtained as a result of the reading the white area 53A does not fall outside the predetermined range, a negative decision (NO) is obtained in step S33 and the control unit 55 determines that external light L is not entering the reading table 4 in step S34. On the other hand, when it is determined in step S33 that the CIS output obtained as a result of the reading the white area 53A is outside the predetermined range, an affirmative decision (YES) is obtained in step S33, and the control unit 55 determines that external light L is entering the reading table 4 in step S35.

Referring back to the flowchart of FIG. 8, when the determination made in step S7 indicates that external light L is not entering the reading table, the control flow goes to step S8 in which the control unit 55 sets to use the adjusted value having been obtained with respect to the reference member 53, as the value of the amount of the light emitted from the light source 42 during image reading, i.e., while the carriage 41 is reciprocated along the platen glass 20 and the light receiving element 44 converts the reflected light received from the document into electrical signals. On the other hand, when the control unit determines in step S7 that external light is entering the reading table 4, the control flow goes to step S9 in which the control unit 55 sets to use the prescribed value stored in the EEPROM 59, as the value of the amount of the light emitted from the light source 42 during image reading, i.e., while the carriage 41 is reciprocated along the platen glass 20 and the light receiving element 44 converts the reflected light received from the document into electrical signals. The control flow then goes to step S10 to implement the shading correction, and to step S11 to store, in a RAM 58, image data, i.e., the CIS output having been subjected to the shading correction.

According to the second embodiment, the white area 53A of the reference member 53 is read while the light source 42 of the CIS unit 40 is on, and the control unit 55 determines whether external light L is entering the reading table 4 or not based on the value of the CIS output obtained as a result of the reading the white area 53A. Hence, external light L entering the reading table 4 can be detected without using any sensor provided specially for external light detection, thereby reducing the size and cost of the multifunctional apparatus.

In the present embodiment, the reading of the white area 53A of the reference member 53 by the CIS unit 40 for the purpose of detecting external light L is performed separately from the light amount adjustment for the light source 42 of the CIS unit 40. However, the detection of external light L may be implemented using the value of the CIS output obtained by the reading the white area 53A in the light amount adjustment.

More specifically, the second embodiment may be modified as follows. In the image reading operation routine shown in FIG. 8, in the case where external light L is not entering the reading table 4 during the light amount adjustment of step S1, an adjusted value of the amount of the light emitted from the light source 42 takes the value S as shown in FIG. 9A. On the other hand, in the case where external light L is entering the reading table 4 during the light amount adjustment, the value of the CIS output obtained by the reading the white area 53A in the light amount adjustment is smaller than the value S by an amount corresponding to the external light L. Thus, in the latter case, the adjusted value of the light amount is made smaller than that in the former case, as indicated by two-dot chain line in FIG. 9B. Hence, the control unit 55 determines whether the adjusted value obtained in the light amount adjustment falls outside a predetermined range or not. This range is determined based on the prescribed value of the light amount as stored in the EEPROM 59. More specifically, the range is obtained by multiplying the prescribed value set in the EEPROM 59 upon factory shipping of the multifunctional apparatus 1, by a coefficient, e.g., 0.8. The control unit 55 determines that external light is not entering the reading table 4 when the adjusted value is not outside the predetermined range, and determines that external light is entering the reading table 4 when the adjusted value is outside the range.

According to such an operation, too, the control unit 55 can determine whether external light L is entering the reading table 4, based on the value of the CIS output obtained as a result of reading the white area 53A of the reference member 53 while the light source 42 of the CIS unit 40 is on. That is, when the document holding member 6 is open relative to the reading table 4, external light enters the reading table 4 to affect reading of the reference member 53. In this state, when the reference member 53 is read by the CIS unit 40 as an image reading device while the reference member 53 is irradiated with light emitted from the light source 42, a value of the CIS output obtained as a result of the reading the reference member 53 differs from a value thereof that would be obtained if the reference member 53 is read while the external light is not entering the reading table 4, by an amount corresponding to the external light. Hence, it can be determined that external light is entering the reading table 4 when the value of the CIS output obtained by the reading the reference member 53 is out of the predetermined range, which may be determined, for instance, by multiplying, by a coefficient, a value of the CIS output when the CIS unit 40 reads the reference member 53 while the document holding member 6 is closed and the light source 42 is on.

In the second embodiment, a close-contact type image sensor in the form of the CIS unit 40 is used as an image reading device. However, other types of image sensors or image reading devices may be employed instead. For instance, a CCD image sensor of a miniaturized optical system may be employed. In the case where a CCD image sensor is employed as an image reading device, the output of the CCD image sensor may take a negative value, or appear on the negative side that is opposite to the side as shown in FIGS. 9A-9C illustrating the case with the close-contact type image sensor 40, such that an absolute value of the negative value obtained as a result of reading by the CCD image sensor increases with increase in the sensed light amount. In this case, when external light L is entering the reading table 4, the value of the output of the CCD image sensor is shifted to the negative side by an amount corresponding to the external light L, and thus the above-described predetermined range serving as a criterion used in the external light detection is determined in view of the shift to the negative side.

It is to be understood that the second embodiment may not be limited to the details described above, but may be modified in the same manner as described at the last of the description of the first embodiment. That is, the way the result of the external light detection, i.e., the information whether external light is entering the reading table 4 or not, is utilized may be otherwise, the timing at which the external light detection is implemented may be otherwise, and the ADF 5 may be configured such that the positional relationship in the vertical direction between the document supply tray 22 and the catch tray 23 may be inverse to change the direction in which the guide surface 52 in the partitioning member 51 guides the document sheet.

Third Embodiment

Figure 14:
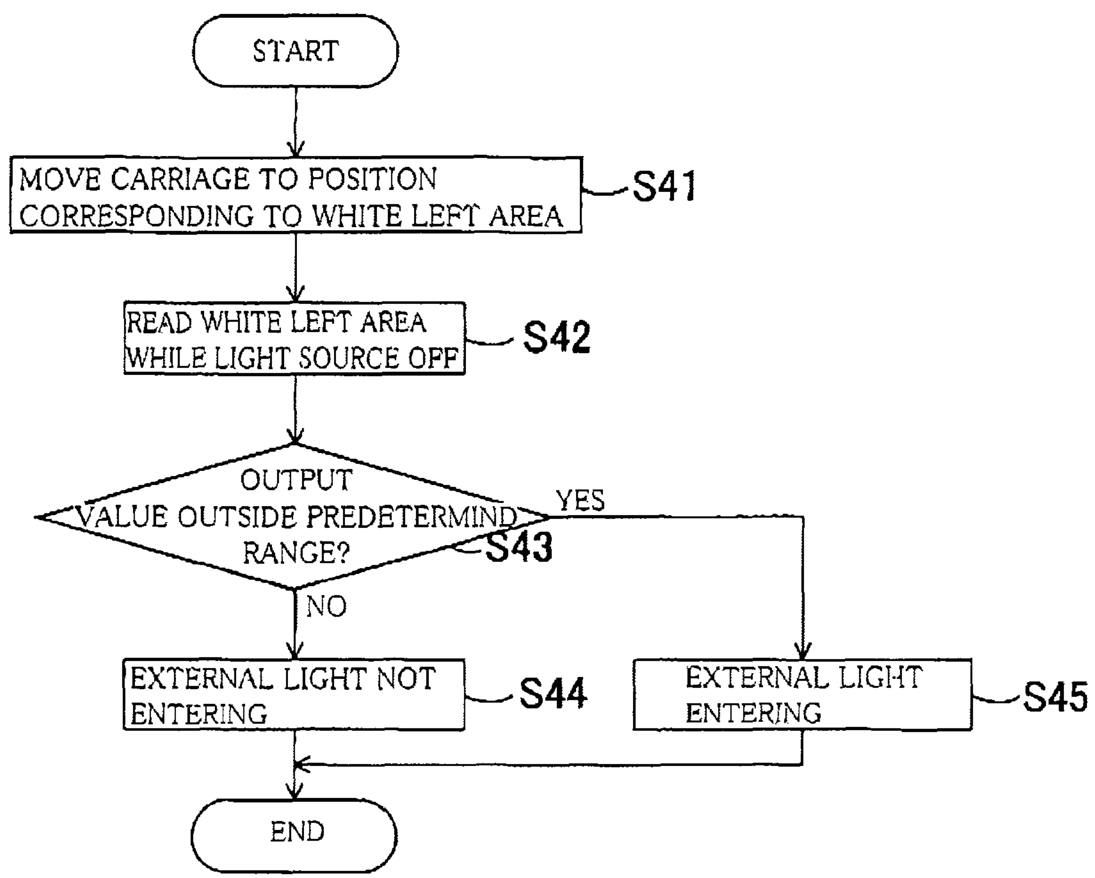
FIG. 14 is a flowchart illustrating an external light detection routine according to a third embodiment of the invention.

There will be now described an image reading apparatus according to a third embodiment, by referring to FIG. 14.

In the first embodiment, the white area 53A and the black area 53B of the reference member 53 are read while the light source 42 of the CIS unit 40 is off, and whether external light is entering the reading table 4 is determined based on the difference between the values of the CIS output that are obtained by reading the white area 53A and the black area 53B, respectively, as shown in FIG. 10. In the third embodiment, however, a white area 53A of a reference member 53 is read while a light source 42 of a CIS unit 40 is off, and whether external light is entering a reading table 4 is determined based on a value of the CIS output obtained by the thus reading the white area 53A. Other than this, the structure of the multifunctional apparatus 1 according to the third embodiment is identical with that of the first embodiment.

There will be described operation of a scanner portion 2 of the image reading apparatus according to the third embodiment. The scanner portion 2 is used in the same way as in the first embodiment, in either of the cases where the scanner portion 2 is used as a FBS and where an ADF 5 is used. Further, the image reading operation by the scanner portion 2 according to the third embodiment is generally identical with that according to the first embodiment. That is, before the CIS unit 40 initiates reading an image on a document sheet, an output of the CIS unit 40 is adjusted, namely, the light amount adjustment for adjusting the CIS output i.e., the adjustment of the amount of light emitted from the light source 42) and the acquisition of the white level data and black level data are implemented, and the external light detection is implemented, as shown in the flowchart of FIG. 8.

Referring to a flowchart of FIG. 14 illustrating an external light detection routine according to the third embodiment, an operation to detect whether external light is entering the reading table 4 or not will be described in detail. The external light detection routine corresponds to step S7 in the image reading operation routine of FIG. 8, and begins with step S41 in which the control unit 55 moves a carriage 41 in order that the CIS unit 40 is located at a position corresponding to a white left one 53A of three areas of a reference member 53. The routine or control flow then goes to step S42 in which the control unit 55 operates to read the white area 53A of the reference member 53 while the light source 42 of the CIS unit 40 is off.

Figure 11A:
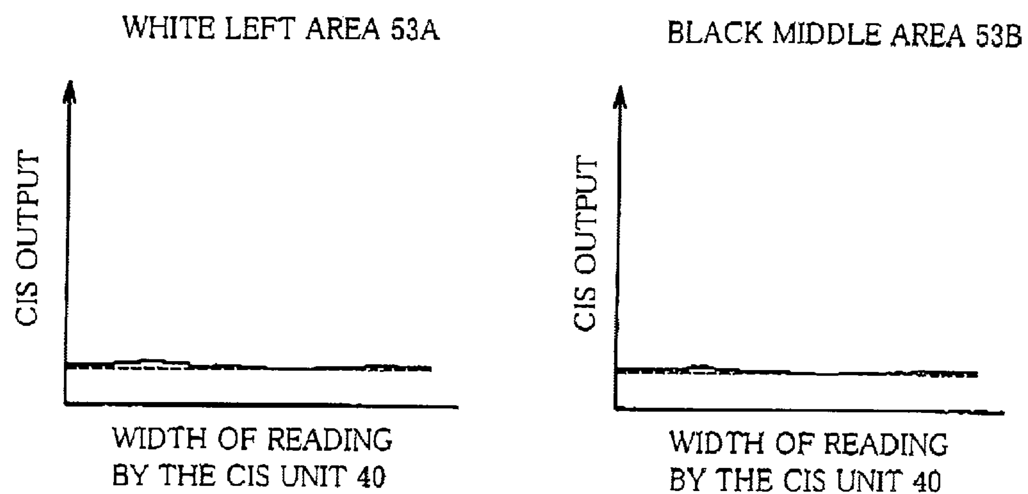
FIG. 11A represents graphs of the CIS output for a white area and a black area in the reference member, respectively, in the case where external light is not entering the reading table.
Figure 11B:
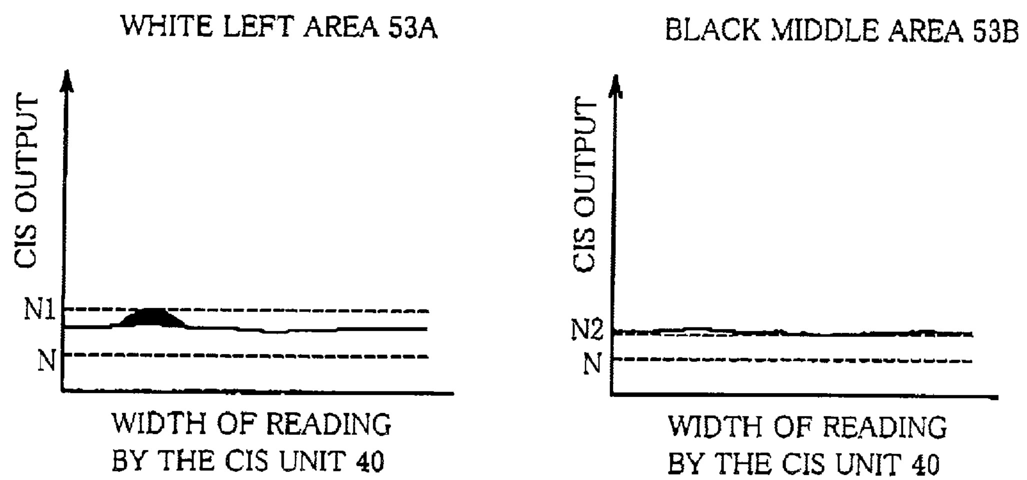
FIG. 11B represents graphs of the CIS output for the white and black areas, respectively, in the case where external light is entering the reading table.

When the CIS unit 40 reads the white area 53A with the light source 42 off while the document holding member 6 is closed relative to the reading table 4 and external light L is not entering the reading table 4, reflected light does not come from the white area 53A to the CIS unit 40, and thus the CIS output takes a value equal to the value N obtained as the black level data, as shown in FIG. 11A.

On the other hand, while the document holding member 6 is open relative to the reading table 4 and external light L is entering the reading table 4, a part of the external light L is incident on and read by the CIS unit 40, and another part of the external light L is reflected by the white area 53A and the reflected light is also read by the CIS unit 40. Thus, the CIS output takes the value N1 corresponding to these parts of the reflected light L, as shown in FIG. 11B.

The control flow then goes to step S43 in which the control unit 55 operates to determine whether the value of the CIS output obtained by the reading the white area 53A while the light source 42 is off falls outside a predetermined range or not. For instance, this range may be determined by multiplying the black level data as a reference signal outputted from the CIS unit 40, by a predetermined coefficient, and preset in the EEPROM 59. When it is determined in step S43 that the value of the CIS output obtained by the reading the white area 53A is not outside the predetermined range, the control flow goes to step S44 in which the control unit 55 determines that external light L is not entering the reading table 4. On the other hand, when it is determined in step S43 that the value of the CIS output obtained by the reading the white area 53A is outside the range, the control goes to step S45 in which the control unit 55 determines that external light L is entering the reading table 4.

Referring back to the flowchart of FIG. 8, when the determination made in step S7 indicates that external light L is not entering the reading table, the control flow goes to step S8 in which the control unit 55 sets to use the adjusted value having been obtained with respect to the reference member 53, as the value of the amount of the light emitted from the light source 42 during image reading, i.e., while the carriage 41 is reciprocated along the platen glass 20 and the light receiving element 44 converts the reflected light received from the document into electrical signals. On the other hand, when the control unit determines in step S7 that external light is entering the reading table, the control flow goes to step S9 in which the control unit 55 sets to use the prescribed value stored in the EEPROM 59, as the value of the amount of the light emitted from the light source 42 during image reading, i.e., while the carriage 41 is reciprocated along the platen glass 20 and the light receiving element 44 converts the reflected light received from the document into electrical signals. The control flow then goes to step S10 to implement the shading correction, and to step S11 to store, in a RAM 58, image data, i.e., the CIS output having been subjected to the shading correction.

According to the scanner portion 2 of the multifunctional apparatus 1 of the third embodiment, the white area 53A of the reference member 53 is read while the light source 42 of the CIS unit 40 is off and the control unit 55 determines whether external light L is entering the reading table 4 or not based on the value of the CIS output obtained by the reading the white area 53A. That is, when the document holding member 6 is open relative to the reading table 4, external light L enters the reading table 4 to affect the reference member 53. In this state, when the reference member 53 is read by the CIS unit 40 as an image reading device while the light source 42 is off, a value obtained as a result of the reading the reference member 53 differs from a value that would be obtained if the reference member 53 is read while the external light L is not entering the reading table 4, by an amount corresponding to the external light L. Hence, it can be determined that external light L is entering the reading table 4 when the value of the CIS output obtained by reading the reference member 53 is out of the predetermined range, which may be determined, for instance, by multiplying (i) a value of the CIS output that is obtained when the CIS unit 40 reads the reference member 53 while the document holding member 6 is closed and the light source 42 is off, or (ii) the black level data as a reference signal outputted from the CIS unit 40, by a coefficient.

In this way, external light L entering the reading table 4 can be detected without using any sensor provided specially for external light detection, thereby reducing the size and cost of the multifunctional apparatus.

In the third embodiment, the reading the white area 53A of the reference member 53 by the CIS unit 40 for the purpose of detecting external light L entering the reading table 4 is implemented separately from the light amount adjustment for adjusting the amount of the light emitted from the light source 42 of the CIS unit 40. However, the third embodiment may be modified such that the external light detection, namely, the reading the white area 53A with the light source 42 off, is performed at the same time with the light amount adjustment.

In the third embodiment, a close-contact type image sensor in the form of the CIS unit 40 is used as an image reading device. However, other types of image sensors or image reading devices may be employed instead. For instance, a CGD image sensor of a miniaturized optical system may be employed. It is to be understood that the third embodiment is not limited to the details described above, but may be modified as described at the last of the description with respect to the first embodiment. That is, the way the result of the external light detection, i.e., the information whether external light is entering the reading table 4 or not, is utilized may be otherwise, the timing at which the external light detection is implemented may be otherwise, and the ADF 5 may be configured such that the positional relationship in the vertical direction between the document supply tray 22 and the catch tray 23 may be inverse to change the direction in which the guide surface 52 in the partitioning member 51 guides the document sheet.

Fourth Embodiment

Figure 15:
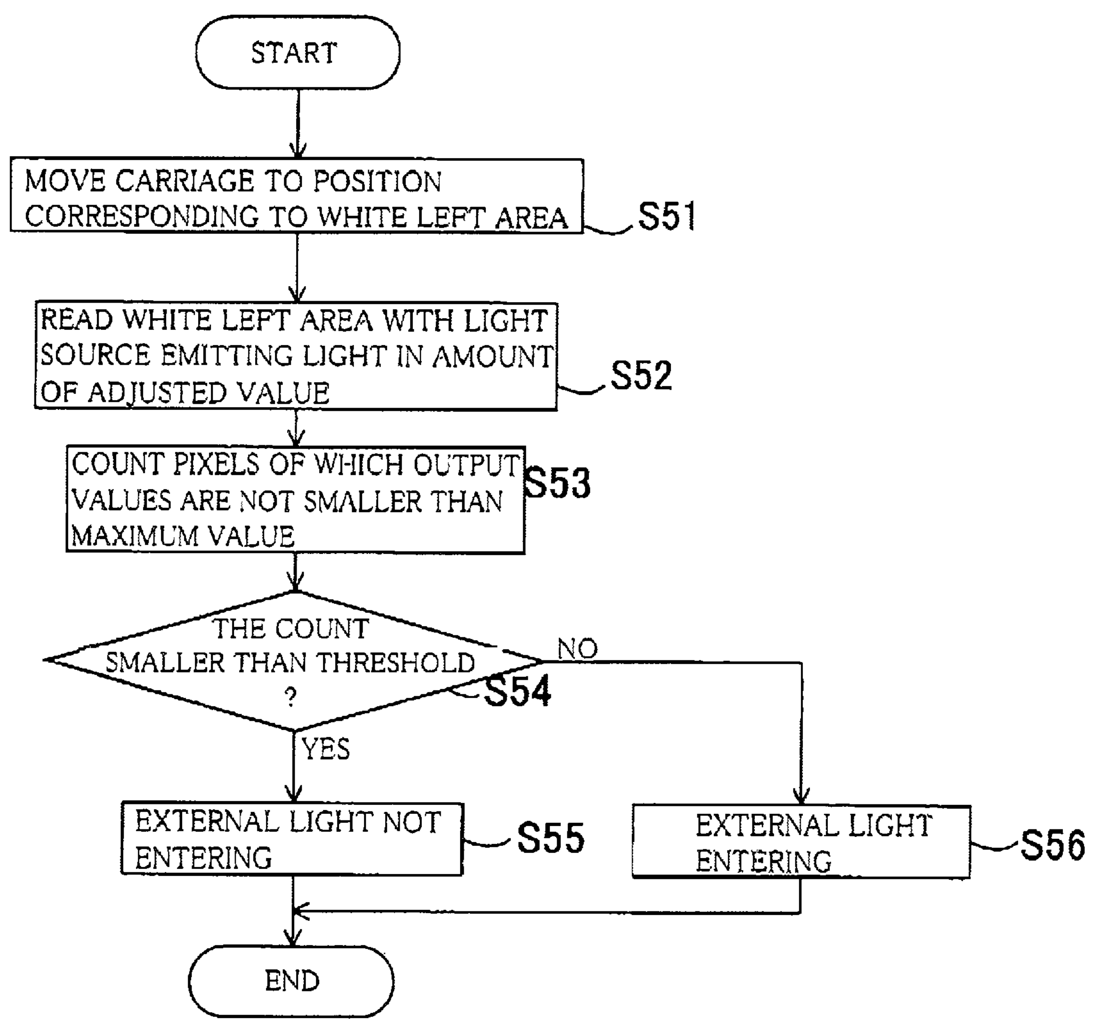
FIG. 15 is a flowchart illustrating an external light detection routine according to a fourth embodiment of the invention.

There will be now described an image reading apparatus according to a fourth embodiment of the invention, by referring to FIG. 15.

In the first embodiment, the white area 53A and the black area 53B of the reference member 53 are read while the light source 42 of the CIS unit 40 is off, and whether external light is entering the reading table 4 or not is determined based on the difference between the values of the CIS output that are obtained by reading the white area 53A and the black area 53B, respectively, as shown in FIG. 10. In the fourth embodiment, however, a white area 53A of a reference member 53 is read while a light source 42 of a CIS unit 40 is on, and unit areas of which the values of the CIS output are not smaller than a maximum value of a CIS output range are counted, and whether external light is entering the reading table 4 or not is determined based on the count. Other than this, the structure of the multifunctional apparatus 1 according to the fourth embodiment is identical with that of the first embodiment There will be described operation of a scanner portion 2 of the image reading apparatus 1 according to the fourth embodiment. The scanner portion 2 is used in the same way as in the first embodiment, in either of the cases where the scanner portion 2 is used as a FBS and where an ADF 5 is used. Further, the image reading operation by the scanner portion 2 according to the third embodiment is generally identical with that according to the first embodiment. That is, before the CIS unit 40 initiates reading an image on a document sheet, an output of the CIS unit 40 is adjusted, namely, the light amount adjustment for adjusting the CIS output (i.e., the adjustment of the amount of light emitted from the light source 42) and the acquisition of the white level data and black level data are implemented, and the external light detection is implemented.

Referring to a flowchart of FIG. 15 illustrating an external light detection routine according to the fourth embodiment, an operation to detect whether external light is entering the reading table 4 or not will be described in detail. The external light detection routine corresponds to step S7 in the image reading operation routine of FIG. 8, and begins with step S51 in which the control unit 55 moves a carriage 41 in order that the CIS unit 40 is located at a position corresponding to a white left one 53A of three areas of a reference member 53. The routine or control flow then goes to step S52 in which the control unit 55 makes the CIS unit 40 read the white area 53A of the reference member 53 while the light source 42 irradiating the white area 53A with light in an amount of a prescribed value as stored in an EEPROM 59.

In the fourth embodiment, the prescribed value of the amount of the light emitted from the light source 42 is so determined as to be equal to an adjusted value thereof that would be obtained if the document holding member 6 is closed and external light is not entering the reading table 4, and such that when the white area 53A of the reference member 53 is read while the light source 42 emits light in the amount of the prescribed value and external light L does not enter the reading table, the CIS output takes a substantially maximum value in a range of values that the CIS output can take. This range will be referred to as "the CIS output range". Where the maximum value in the CIS output range is a desired value S shown in FIG. 9A, when the light source 42 emits light in the amount of the prescribed value toward the white area 53A while external light L is not entering the reading table 4, the CIS output substantially takes the desired value S, but possibly with a slight deviation therefrom due to instability in the operations of the light source 42 and the light receiving element 44, and for other reasons.

On the other hand, where external light L is entering the reading table 4, when the light source 42 is operated to emit light in the amount of the prescribed value toward the white area 53A, the CIS output takes a value that is a sum of a quantity corresponding to the light emitted from the light source 42 and reflected by the white area 53A, a quantity corresponding to the external light L, and a quantity corresponding to the external light L as reflected by the white area 53A. That is, in addition to the light emitted from the light source 42 and reflected by the white area 53A, the external light L entering the reading table 4 is also incident on and read by the CIS unit 40, and furthermore, the external light L is reflected by the white area 53A and this reflected light is also read by the CIS unit 40 or its light receiving element 44. Hence, the CIS output would take a value S2 that is higher than the value S that is desired to be obtained when reading the white area 53A, by an amount corresponding to the external light L, as schematically shown in FIG. 9C.

Meanwhile, the CIS output is A/D converted by an ASIC 61, and a maximum value of the CIS output that is to be A/D converted is set at the value S. Hence, when the CIS output takes a value not smaller than the value S, such as the value S2, the ASIC 61 set to A/D convert the output of the CIS unit 40 outputs a signal indicative of the fact that the CIS output currently takes a value not smaller than the maximum value. For instance, where the signal is of eight bits, this signal may be "FF". The routine or control flow then goes to step S53 in which the control unit 55 counts unit areas for which the signal such as FF is outputted. The control flow then goes to step S54 in which the control unit 55 determines whether the count is smaller than a predetermined reference number or not. This reference number may be preset in the EEPROM 59. When the count is smaller than the reference number, the control unit 55 makes an affirmative decision (YES) in step S54, that is, determines that external light L is not entering the reading table 4, in step S55. On the other hand, when the count is not smaller than the reference number, the control unit 55 makes a negative decision (NO) in step S54, that is, determines that external light L is entering the reading table 4, in step S56.

Referring back to the flowchart of FIG. 8, when the determination made in step S7 indicates that external light L is not entering the reading table, the control flow goes to step S8 in which the control unit 55 sets to use the adjusted value having been obtained with respect to the reference member 53; as the value of the amount of the light emitted from the light source 42 during image reading, i.e., while the carriage 41 is reciprocated along the platen glass 20 and the light receiving element 44 converts the reflected light received from the document into electrical signals. On the other hand, when the control unit determines in step S7 that external light is entering the reading table, the control flow goes to step S9 in which the control unit 55 sets to use the prescribed value stored in the EEPROM 59, as the value of the amount of the light emitted from the light source 42 during image reading, i.e., while the carriage 41 is reciprocated along the platen glass 20 and the light receiving element 44 converts the reflected light received from the document into electrical signals. The control flow then goes to step S10 to implement the shading correction, and to step S11 to store, in a RAM 58, image data, i.e., the CIS output having been subjected to the shading correction.

According to the scanner portion 2 of the multifunctional apparatus 1 according to the fourth embodiment, the white area 53A of the reference member 53 is read while the light source 42 of the CIS unit 40 is on, and the control unit 55 counts the unit areas of which CIS output values are not smaller than the maximum value in the CIS output range, and determines whether external light L is entering the reading table based on the count. That is, the control unit 55 in advance makes an adjustment such that the CIS output substantially takes the maximum value in the predetermined CIS output range. Such an output adjustment may be implemented, for instance, by adjusting the amount of the light emitted from the light source 42, or adjusting a gain of the output of the light receiving element 44. The output adjustment is implemented with respect to the CIS output when the CIS unit 40 reads the reference member 53 with the document holding member 6 closed. Then, as described above, the reference member 53 is read while the light source 42 of the CIS unit 40 whose output has been adjusted is on. As described above, in a case where external light is entering the reading table 4, a value obtained by the reading the reference member 53 by the CIS unit 40 becomes larger than that in another case where the external light is not entering, by an amount corresponding to the external light. Hence, in the former case, when the value obtained as a result of the reading the reference member 53 is obtained for each unit area, values of some of all the unit areas will be equal to or larger than the maximum value of the predetermined CIS output range. The unit areas of which CIS output values are not smaller than the maximum value are counted, and it can be determined that external light is entering the reading table 4 when the count is not smaller than the predetermined reference number.

In this way, whether external light L entering the reading table 4 can be detected without using any sensor provided specially for external light detection, thereby reducing the size and cost of the multifunctional apparatus.

In the present embodiment, it is controlled such that the CIS output substantially takes the maximum value when the amount of the light emitted from the light source 42 of the CIS unit 40 is adjusted to the prescribed value. However, it may be otherwise controlled to have the CIS output take the maximum value in the CIS output range. For instance, the CIS output obtained when the white area 53A is irradiated with light of an amount and emitted from the light source 42 may be amplified by a gain that is so adjusted that the amplified CIS output takes the substantially maximum value in the CIS output range.

In the fourth embodiment, a close-contact type image sensor in the form of the CIS unit 40 is used as an image reading device. However, other types of image sensors or image reading devices may be employed in place of the close-contact type image sensor. For instance, a CCD image sensor of a miniaturized optical system may be employed. In the case where the CCD image sensor is employed as an image reading device, and an output of the CCD image sensor takes negative values, the output of the CCD image sensor is adjusted to be maximum on the negative side in other words, the absolute value of the output is to be adjusted. It is to be understood that the fourth embodiment is not limited to the details described above, but may be modified as described at the last of the description with respect to the first embodiment. That is, the way the result of the external light detection, i.e., the information whether external light is entering the reading table 4 or not, is utilized may be otherwise, the timing at which the external light detection is implemented may be otherwise, and the ADF 5 may be configured such that the positional relationship in the vertical direction between the document supply tray 22 and the catch tray 23 may be inverse to change the direction in which the guide surface 52 in the partitioning member 51 guides the document sheet.

What is claimed is:

1. An image reading apparatus comprising:

a reading table comprising a transparent plate comprising an exposed area which constitutes a part of an outer surface of the reading table exposed to the exterior, and on which a document with an image thereon is placed;

a document holding member movable relative to the reading table and between a closed position and an open position, and thus holding the document and covering the transparent plate;

a scanning device which is disposed on a side of the transparent plate opposite to the side on which the document is supported on the transparent plate, the scanning device being reciprocated in a predetermined direction along the transparent plate;

an image reading device mounted in the scanning device and including a light source, the image reading device emitting light from the light source toward the document placed on the transparent plate, and receiving the reflected light from the document, to read the image on the document thereby;

a control unit which controls reading by the image reading device, and a reciprocating movement of the scanning device;

a reference member which is disposed within the exposed area on the transparent plate, and used as a reference when an amount of the light emitted from the light source of the image reading device is adjusted; and an external-light detector which determines whether external light is entering the reading table, based on at least one value obtained as a result of reading the reference member by the image reading device, wherein the reference member comprises a white area and a black area that are arranged in the direction of the reciprocation of the scanning device, and wherein the external-light detector determines that external light is entering the reading table when a difference between the value obtained by reading the white area while the light source is off and the value obtained by reading the black area while the light source is off, is not less than a predetermined threshold.

2. The apparatus according to claim 1, wherein the reference member is interposed between the transparent plate and an exposed member which is disposed on the transparent plate within the exposed area.

3. The apparatus according to claim 2, wherein the exposed member is a partitioning member which divides the exposed area into a plurality of sections.

4. The apparatus according to claim 3, wherein the partitioning member divides the exposed area into a fed-document reading surface where the image reading device reads an image on a sheet document as fed in a predetermined feeding direction, and a stationary document reading surface where the image reading device reads an image on a document fixed in position on the transparent plate.

5. The apparatus according to claim 3, wherein the document holding member comprises an automatic document feeder which feeds the sheet document set in a document supply tray to the fed-document reading surface and then ejects the sheet document onto a catch tray, and wherein the partitioning member comprises a guide surface on a side thereof opposed to the document holding member, the guide surface guiding the sheet document yet to be read, to the fed-document reading surface.

6. The apparatus according to claim 3, wherein the document holding member comprises an automatic document feeder which feeds the sheet document set in a document supply tray to the fed-document reading surface and then ejects the sheet document onto a catch tray, and wherein the partitioning member comprises a guide surface on a side thereof opposed to the document holding member, the guide surface guiding the sheet document having been read, from the fed-document reading surface to the catch tray.

7. The apparatus according to claim 1, wherein the image reading device is an image sensor of close-contact type.

8. The apparatus according to claim 1, wherein the control unit uses an adjusted value having been obtained with respect to the reference member as the value of the amount of the light emitted from the light source when the external light is not detected by the external-light detector, and wherein the control unit uses a prescribed value as the value of the amount of the light emitted from the light source when the external light is detected by the external-light detector.

* * * * *